United States Patent
Sakamoto et al.

(10) Patent No.: US 12,003,685 B2
(45) Date of Patent: Jun. 4, 2024

(54) IMAGE PROCESSING APPARATUS, CONTROL METHOD, AND NON-TRANSITORY COMPUTER-READABLE MEDIUM

(71) Applicant: SHARP KABUSHIKI KAISHA, Sakai (JP)

(72) Inventors: Jumpei Sakamoto, Sakai (JP); Akihito Yoshida, Sakai (JP); Yasutaka Hirayama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/105,844

(22) Filed: Feb. 5, 2023

(65) Prior Publication Data
US 2023/0254431 A1 Aug. 10, 2023

(30) Foreign Application Priority Data
Feb. 7, 2022 (JP) .................................. 2022-017400

(51) Int. Cl.
*H04N 1/393* (2006.01)
(52) U.S. Cl.
CPC .................................. *H04N 1/393* (2013.01)

(58) Field of Classification Search
CPC ...... H04N 1/393; H04N 1/3873; H04N 1/401; H04N 1/409; H04N 1/4097
See application file for complete search history.

(56) References Cited

U.S. PATENT DOCUMENTS

| 10,187,532 | B2 | 1/2019 | Matsuzaki | |
|---|---|---|---|---|
| 2013/0120806 | A1* | 5/2013 | Kawatani | H04N 1/00816 358/474 |
| 2015/0310268 | A1* | 10/2015 | He | G06F 18/22 382/135 |
| 2017/0064095 | A1 | 3/2017 | Matsuzaki | |
| 2017/0126929 | A1* | 5/2017 | Noro | H04N 1/00809 |

FOREIGN PATENT DOCUMENTS

| JP | 2019-029762 A | 2/2019 |
|---|---|---|
| JP | 6566794 B2 | 8/2019 |
| JP | 2019-208136 A | 12/2019 |

\* cited by examiner

*Primary Examiner* — Akwasi M Sarpong
*Assistant Examiner* — Michael L Burleson
(74) *Attorney, Agent, or Firm* — ScienBiziP, P.C.

(57) ABSTRACT

An image processing apparatus includes: an input device that inputs a document image; and a controller, wherein the controller removes a streak from the image by a first method, removes a streak from the image by a second method that differs from the first method, and executes crop processing on the image from which the streaks have been removed.

8 Claims, 28 Drawing Sheets

FIG. 3

| PARAMETER NAME | PARAMETER VALUE |
|---|---|
| ROW_STREAK_MAXSIZE | 10 |
| SEARCH_MAX | 1% of CMAX |
| SEARCH_STOP | 10% of CMAX |
| HIST_MAX | 95% of CMAX |

FIG. 4

| INDEX NUMBER | ROW NUMBER |
|---|---|
| 0 | 259 |
| 1 | 260 |
| 2 | 261 |
| ⋮ | ⋮ |

FIG. 5

| ROW NUMBER | NUMBER OF EDGE PIXELS |
|---|---|
| 0 | 0 |
| 1 | 3 |
| 2 | 19 |
| ⋮ | ⋮ |

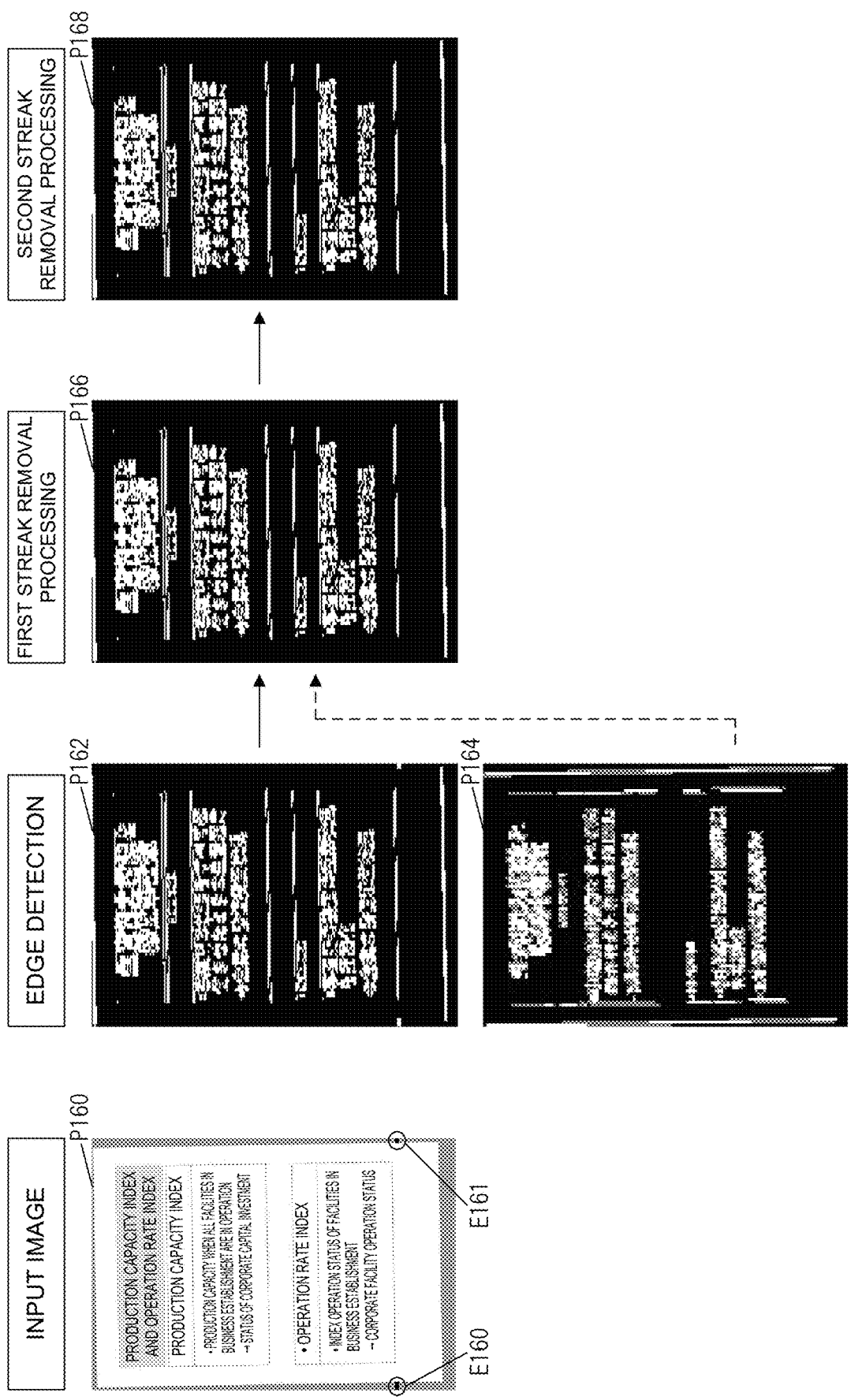

FIG. 25

| PARAMETER NAME | PARAMETER VALUE |
|---|---|
| ROW_STREAK_MAXSIZE | 10 |
| SEARCH_MAX | 1% of CMAX |
| SEARCH_STOP | 10% of CMAX |
| HIST_MAX | 95% of CMAX |
| Streak_Buf | 10 |

IMAGE PROCESSING APPARATUS, CONTROL METHOD, AND NON-TRANSITORY COMPUTER-READABLE MEDIUM

CROSS-REFERENCE TO RELATED APPLICATION

The present application claims priority from Japanese Application JP2022-017400, the content of which is hereby incorporated by reference into this application.

BACKGROUND OF THE INVENTION

1. Field of the Invention

The present disclosure relates to an image processing apparatus and the like.

2. Description of the Related Art

In an image processing apparatus such as a multifunction peripheral, there is a case where a document is fed by a single pass feeder (SPF) and an image of the document is read. In the case where a member, such as a document cover or a document retainer, of the image processing apparatus is in a gray color, the document is read with a gray background outside the document. At this time, due to dirt attached to a document reading surface or color unevenness of sheet metal, in a read image (a scanned image), streak-like noise may be included in an area outside the document. In the case where a document range is detected from such a scanned image, the document range that includes the area with the noise may be detected. Accordingly, when it is attempted to crop the document as usual from the scanned image, which includes the streak-like noise, crop processing is executed in a state where a background portion outside the document is included. As a result, an image (an output image) that includes the background portion is acquired, which is inconvenient for a user.

A description will be made on the above-described example with reference to FIGS. 29A and 29B. FIG. 29A is a view illustrating an example of a scanned image P900. In FIG. 29A, P1 denotes a direction in which the document is read (a primary scanning direction), and P2 denotes a direction in which the document is fed (a secondary scanning direction). Here, as indicated by E900 and E902 in FIG. 29A, the streak-like noise may appear in the scanned image. In general, the streak-like noise appears in the document feed direction, and thus a direction of a streak has been known. FIG. 29B is a view illustrating a document range L910 that is detected on the basis of the scanned image P900. As illustrated in FIG. 29B, due to the streak-like noise, the document range L910 is detected to include the background portion. Just as described, there is a case where the streak-like noise adversely affects detection of the document range and the document range is erroneously detected. There is also a case where, due to the image that is cropped on the basis of the erroneously detected document range, image processing such as a blank sheet determination is not appropriately executed.

In order to solve such problems, such a technique has been proposed to detect the streak-like noise from the scanned image and correct the streak-like noise. For example, the following related art has been proposed. Based on a luminance value, a determination on whether a pixel is a streak candidate is made per pixel position in the primary scanning direction. Then, the number of the pixels that are determined as the streak candidates is counted in the secondary scanning direction, so as to determine whether the pixel at each of the pixel positions is the streak. The following related art has also been proposed. In image data, from which an area for streak detection is cut out, an average value of pixel values of the pixels constituting a line (a line signal value) is acquired per position in the primary scanning direction. Then, the streak is detected by using the line signal value. Furthermore, the following related art has been proposed as a technique using information on the pixel values constituting the line. A determination is made, per line, on whether each of the pixels is a sheet pixel or a background pixel on the basis of the pixel value of the respective pixel included in the line. Then, a determination is made, per line, on whether the line is a medium line or a background line.

SUMMARY OF THE INVENTION

Here, in the related art, there is a case where the streak cannot appropriately be removed due to such a reason that an edge pixel constituting the streak-like noise and a document edge pixel are not appropriately distinguished from each other. For example, the following is described in the related art. A portion with the pixel value that is equal to or lower than a specified value of a pixel value level corresponding to a guide plate area is determined as shadow. In this way, a determination on inside/outside the document is made by using the detected shadow. However, the shadow is not always formed depending on a document state or a feed status, and such a situation occurs where it is impossible to distinguish whether the streak appears inside/outside the document. Consequently, there is a case where the edge pixel of the document that should remain is erroneously removed. In addition, in the method for counting the edge pixels, the edge pixel of the document may be deleted when the streak overlaps the edge pixel of the document. For example, like a scanned image P920 illustrated in FIG. 30A, there is a case where streak-like noise E924 that overlaps a document edge is included in an image including a document image area E920 and a background portion area E922 outside the document. FIG. 30B is a view illustrating a difference image P930 in a longitudinal direction that corresponds to the scanned image P920. The streak-like noise E924 in FIG. 30A appears as an edge pixel E930 in the difference image P930. When the edge pixel E930 is deleted on the basis of the difference image P930, as indicated by a difference image illustrated in FIG. 30C, an edge that constitutes a lower side of the document is also removed. Thus, there is a problem that, by executing the image processing such as the crop processing in a state where the edge pixel of the document is lost, just as described, an image not desired by the user is output.

One aspect of the present disclosure has been made in view of the above-described problem, and therefore has an object of providing an image processing apparatus and the like capable of appropriately removing a streak from an image.

In order to solve the above-described problem, an image processing apparatus according to an aspect of the present disclosure includes: an input device that inputs a document image; and a controller. The controller removes a streak from the image by a first method, removes a streak from the image by a second method that differs from the first method, and executes crop processing on the image from which the streaks have been removed.

A control method according to another aspect of the present disclosure is a control method of an image processing apparatus and includes: removing a streak from an input image by a first method; removing a streak from the image by a second method that differs from the first method; and executing crop processing on the image, from which the streaks have been removed.

A non-transitory computer-readable medium according to further another aspect of the present disclosure stores a program that causes a computer to implement: a function of removing a streak from an input image by a first method; a function of removing a streak from the image by a second method that differs from the first method; and a function of executing crop processing on the image, from which the streaks have been removed.

According to the aspect of the present disclosure, it is possible to provide the image processing apparatus capable of appropriately removing the streak from the image.

BRIEF DESCRIPTION OF THE DRAWINGS

FIG. 3 is a table illustrating a data structure of parameter information in the first embodiment.

FIG. 4 is a table illustrating a data structure of streak position information in the first embodiment.

FIG. 5 is a table illustrating a data structure of edge pixel aggregation information in the first embodiment.

FIG. 18 is a view illustrating the operation example in the first embodiment.

FIG. 25 is a table illustrating a data structure of parameter information in a second embodiment.

DETAILED DESCRIPTION OF THE INVENTION

A description will hereinafter be made on embodiments for carrying out an aspect of the present disclosure with reference to the drawings. Each of the following embodiments is merely one example for describing the aspect of the present disclosure, and the technical scope of the present disclosure set forth in the claims is not limited to the following description.

1. FIRST EMBODIMENT

First, a description will be made on a first embodiment. In the first embodiment, a description will be made on a case where an image processing apparatus according to the aspect of the present disclosure is applied to an image forming apparatus 10. The image forming apparatus 10 is an information processing apparatus that has a copy function, a scan function, a document print function, and the like, and is also referred to as a multi-function printer/peripheral (MFP).

1.1 Functional Configuration

Figure 1:
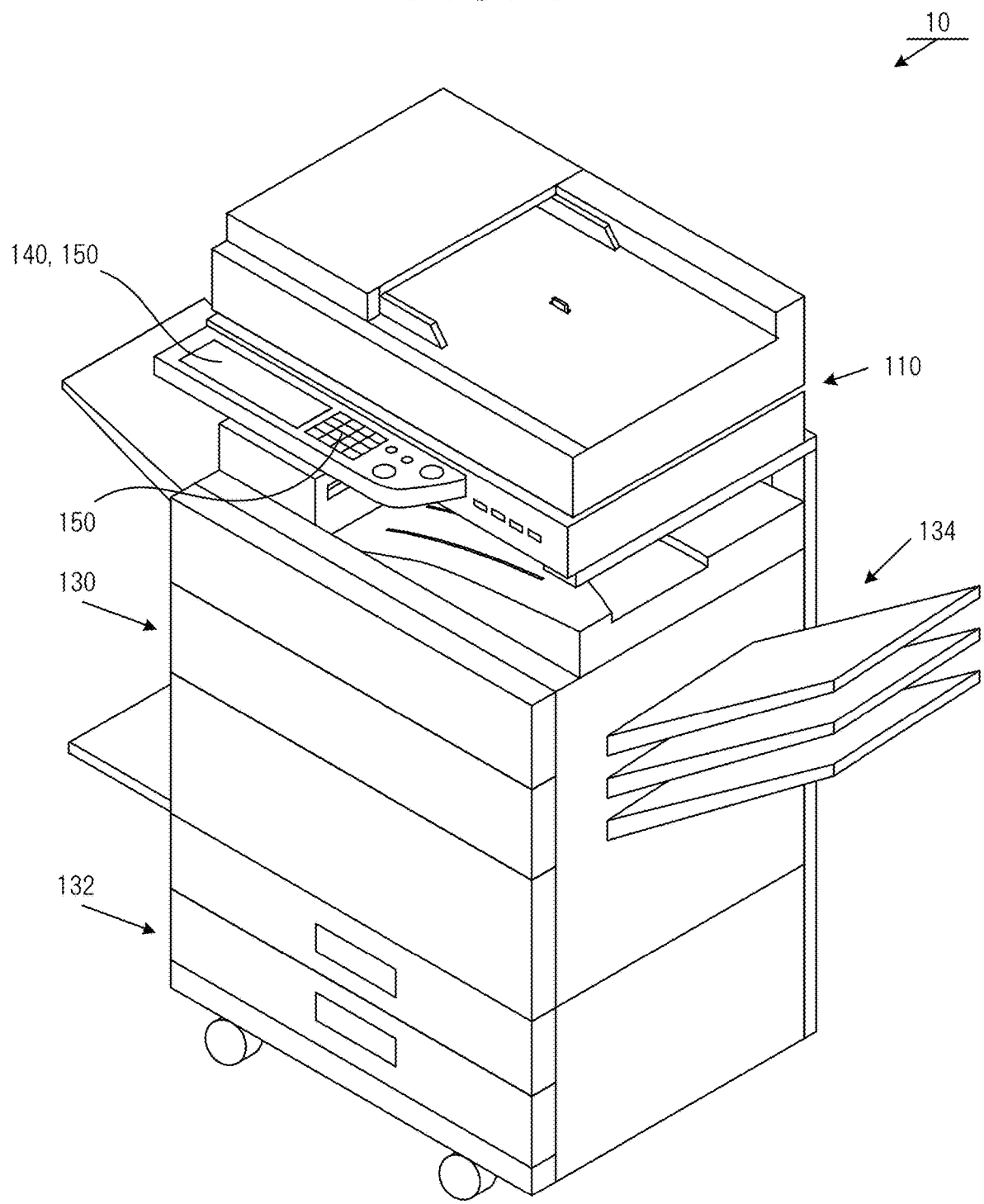
FIG. 1 is a view illustrating an overall configuration of an image forming apparatus in a first embodiment.

A description will be made on a functional configuration of the image forming apparatus 10 in the present embodiment with reference to FIG. 1 and FIG. 2. FIG. 1 is an external perspective view of the image forming apparatus 10, and FIG. 2 is a block diagram illustrating the functional configuration of the image forming apparatus 10.

Figure 2:
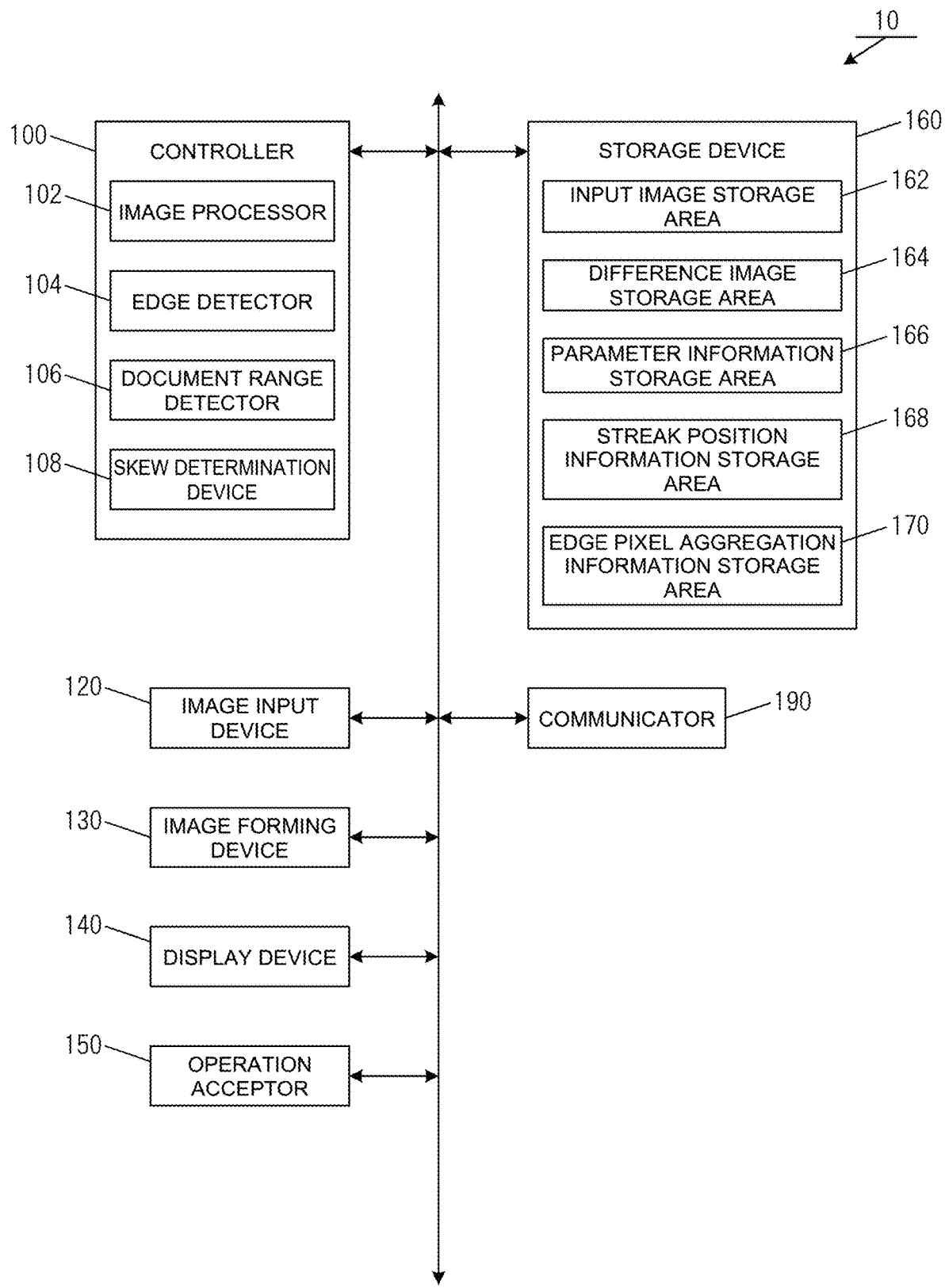
FIG. 2 is a diagram illustrating a functional configuration of the image forming apparatus in the first embodiment.

As illustrated in FIG. 2, the image forming apparatus 10 is configured to include a controller 100, an image input device 120, an image forming device 130, a display device 140, an operation acceptor 150, a storage device 160, and a communicator 190.

The controller 100 is a functional element that executes overall control of the image forming apparatus 10. The controller 100 reads and executes various programs stored in the storage device 160 to implement various functions, and includes, for example, one or more central processing units (CPUs). The controller 100 may be configured as a system on a chip (SoC) having plural functions of those described below.

The controller 100 functions as an image processor 102, an edge detector 104, a document range detector 106, and a skew determination device 108 when executing the programs stored in the storage device 160.

The image processor 102 executes various types of image-related processing. For example, the image processor 102 executes sharpening processing and tone conversion processing on an image that is input by the image input device 120 (hereinafter referred to as an "input image").

The edge detector 104 detects edges of an input document. For example, the edge detector 104 selects each pixel of the input image as a pixel of interest, and acquires, per pixel of interest, a difference in brightness between the pixel of interest and the pixel adjacent to the pixel of interest. In this case, when the difference exceeds a predetermined threshold, the edge detector 104 detects the pixel of interest as the pixel constituting the edge (hereinafter referred to as an "edge pixel"). Alternatively, the edge detector 104 may generate a difference image in which the edge pixels are white pixels and the pixels other than the edge pixels are black pixels. That is, the difference image is a binary image having the pixels, a pixel value (the brightness) of each of which is 0 or 1, or is a grayscale image having the pixels, the pixel value (the brightness) of each of which is any value from 0 to 255. In the present embodiment, a description will be made under the assumption that the difference image is the grayscale image in which the brightness of each of the white pixels is 255 and the brightness of each of the black pixels is 0.

In the present embodiment, the difference image (the difference image in a primary scanning direction) that is generated on the basis of the difference in brightness between the adjacent pixels in the primary scanning direction will be referred to as the difference image in a longitudinal direction. Edges extending in a right-left direction (edges corresponding to a streak, an upper side of the document, and a lower side of the document) are detected from the difference image in the longitudinal direction. In the present embodiment, the streak (an abnormal pixel) means the edge that is included in the input image and included in an area outside an image of the document (outside the document). In addition, in the present embodiment, the difference image (the difference image in a secondary scanning direction) that is generated on the basis of the difference in brightness between the adjacent pixels in the secondary scanning direction will be referred to as a difference image in a transverse direction. Edges extending in an up-down direction (edges corresponding to a right side of the document and a left side of the document) are detected from the difference image in the transverse direction.

The edge detector 104 may generate the difference image for the input image by using an edge detection filter such as a Prewitt filter or a Sobel filter. For example, the edge detector 104 may generate the difference image in the longitudinal direction by applying the edge detection filter to the input image in the longitudinal direction (the primary scanning direction), and may generate the difference image in the transverse direction by applying the edge detection filter to the input image in the transverse direction (the secondary scanning direction). In addition, the edge detector 104 may execute binarization processing on the difference image or apply a highpass filter to the difference image so as to correct the difference image such that the edge pixels in the difference image become the white pixels. Just as described, the edge detector 104 only needs to generate the difference image by using the known method.

The document range detector 106 detects, from the input image, a range where the document image appears (a document range). For example, the document range detector 106 detects the document range by using the method in the related art. Here, the document range detector 106 may set, of the edges detected from the input image, the closest edge to an end of the input image as the edge corresponding to an end of the document and may detect, as the document range, a rectangular area that is in contact with the edge corresponding to the end of the document. That is, the document range detector 106 only needs to detect the document range by using an existing method.

The skew determination device 108 determines whether a skew has occurred to the document and determines an angle of the read document. For example, in the image forming apparatus 10 in which a document cover is provided with plural light-emitting auto paper selector (APS) sensors in the primary scanning direction and in which a light-receptive APS sensor for receiving light from the light-emitting APS sensors is provided on a document surface side, the skew determination device 108 determines whether the skew has occurred to the document by using the sensors. For example, in the case where there is a difference in a light detection time by the light-receptive APS sensor, the skew determination device 108 determines that the skew has occurred to the document.

Here, the skew determination device 108 may determine whether the skew has occurred to the document on the basis of the edge detected from the input image. For example, the skew determination device 108 may acquire the angle of the document on the basis of the document range that is detected by the document range detector 106. Then, in the case where the angle of the document exceeds a predetermined angle, the skew determination device 108 may determine that the skew has occurred to the document.

The image input device 120 inputs the image to the image forming apparatus 10. For example, the image input device 120 includes a scanner that reads the document placed on a document table, and the like. The image input device 120 may be constructed of: an SPF; the scanner that reads the image of the document fed by the SPF; and the like. The scanner is a device that converts the image into an electrical signal by an image sensor such as a charge coupled device (CCD) or a contact image sensor (CIS) and quantizes and encodes the electrical signal. When the image of the document is read by the scanner, the image of the document is input, as digital data, to the image forming apparatus 10.

The image forming device 130 forms (prints) the image on a recording medium such as recording paper. The image forming device 130 includes, for example, a printing device such as a laser printer using an electrophotographic method. For example, the image forming device 130 feeds the recording paper from a paper feed tray 132 in FIG. 1, forms the image on a surface of the recording paper, and discharges the recording paper from a paper discharge tray 134.

The display device 140 shows various types of information. For example, the display device 140 includes a display such as a liquid crystal display (LCD), an electro-luminescence (EL) display, or a micro light emitting diode (LED) display.

The operation acceptor 150 accepts an operation instruction from a user who uses the image forming apparatus 10. The operation acceptor 150 includes an input device such as a key switch (a hard key) or a touch sensor. An input by contact (touching) may be detected by the touch sensor by a common detection method such as a resistive method, an infrared method, an inductive method, or a capacitive method. The image forming apparatus 10 may have a touch panel that includes the display device 140 and the operation acceptor 150 integrated into one unit.

The storage device 160 stores the various programs that are necessary for operation of the image forming apparatus 10 and various types of data. For example, the storage device 160 includes a storage such as a solid state drive (SSD), which is semiconductor memory, or a hard disk drive (HDD).

The storage device 160 secures, as storage areas, an input image storage area 162 for storing the input image, a difference image storage area 164 for storing a difference image, a parameter information storage area 166, a streak position information storage area 168, and an edge pixel aggregation information storage area 170.

The parameter information storage area 166 stores information (parameter information) in which a parameter name and a parameter value corresponding to the parameter name are associated with each other. For example, as illustrated in FIG. 3, the parameter information includes the parameter name (for example, "ROW_STREAK_MAXSIZE") and the parameter value (for example, "10") corresponding to the parameter name.

In the present embodiment, the following parameters are stored in the parameter information storage area 166.

(1) ROW_STREAK_MAXSIZE
ROW_STREAK_MAXSIZE indicates a threshold of the allowable number of the streaks present in the input image.
(2) SEARCH_MAX
SEARCH_MAX indicates a threshold of the number of searched pixels at the time when the edge pixels constituting the streak are searched from an image end of the difference image in first streak detection processing, which will be described below.
(3) SEARCH_STOP
SEARCH_STOP indicates a threshold of the number of the pixels at which removal of the streak is stopped at the time when the streak is removed from the input image in first streak removal processing, which will be described below.
(4) HIST_MAX
HIST_MAX indicates a threshold of the number of the edge pixels included in a row of interest at the time when it is determined that the streak is present in the row of interest in second streak removal processing, which will be described below.

The parameter value that corresponds to each of the above-described parameter name may be indicated by a numerical value or may be indicated by a ratio such as "1% of CMAX". The parameter value may be set in advance or may be settable by the user.

CMAX is a maximum value (a column width) of a column number in the difference image in the longitudinal direction. The column number is the number of the pixels in the transverse direction that are included from the top left pixel of the image as an origin (0,0) to the pixel of interest. That is, the column number corresponds to x when a position of the pixel included in the image is represented by coordinates (x, y), where x is the number of the pixels in the transverse direction included from the origin to the pixel of interest, and y is the number of the pixels in the longitudinal direction. A row number corresponds to y of the coordinates (x, y).

In the following description, the parameter value corresponding to the parameter name "ROW_STREAK_MAXSIZE" will be described as ROW_STREAK_MAXSIZE. Similarly, the parameter value corresponding to the parameter name "SEARCH_MAX" will be described as SEARCH_MAX. The parameter value corresponding to the parameter name "SEARCH_STOP" will be described as SEARCH_STOP. The parameter value corresponding to the parameter name "HIST_MAX" will be described as HIST_MAX.

The streak position information storage area 168 stores information (streak position information) on the row (the position) where the streak is present. For example, as illustrated in FIG. 4, the streak position information includes an index number (for example, "0") and the row number (for example, "259").

The index number is a serial number that is assigned to identify the streak position information. For example, the index number is an integer that is equal to or larger than 0. In the present embodiment, the row is a set of the pixels (a pixel group) having the same row number and is the pixel group that continues in the same direction as the secondary scanning direction. A row whose row number is "259" indicates a pixel group in which the coordinates of each of the pixels are any of (0, 259) to (CMAX, 259).

The edge pixel aggregation information storage area 170 stores, per row of the input image, information that is acquired by aggregating the number of the edge pixels included in the row of interest (edge pixel aggregation information). For example, as illustrated in FIG. 5, the edge pixel aggregation information includes the row number (for example, "0") and the number of the edge pixels (for example, "0").

The communicator 190 communicates with an external device via a local area network (LAN) or a wide area network (WAN). The communicator 190 includes, for example, a communication device, such as a network interface card (NIC) used in the wired/wireless LAN, and a communication module.

1.2 Processing Flow

A description will be made on a flow of processing that is executed by the image forming apparatus 10 in the present embodiment with reference to FIGS. 6 to 10. The processing illustrated in FIGS. 6 to 10 is executed when the controller 100 reads the program that is stored in the storage device 160. In addition, the processing illustrated in FIGS. 6 to 10 is executed when the user performs an operation to initiate a document reading job such as a copy job or a scan job.

1.2.1 Main Processing

Figure 6:
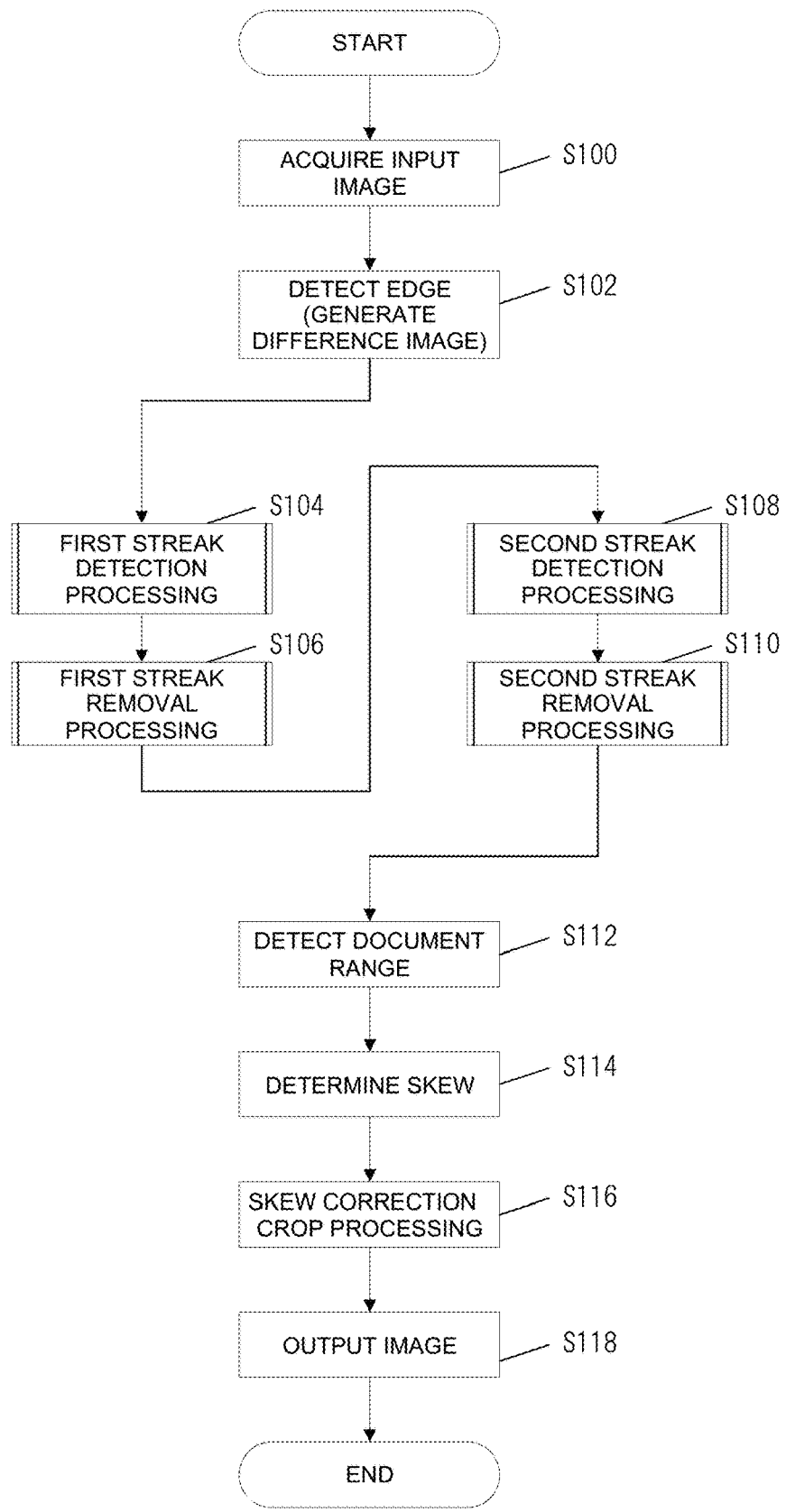
FIG. 6 is a flowchart illustrating a flow of main processing in the first embodiment.

First, a description will be made on a flow of main processing with reference to FIG. 6. The controller 100 controls the image input device 120 to thereby read the document and acquire a scanned image (an input image) of the document (step S100). At this time, the controller 100 stores the input image in the input image storage area 162.

The image forming apparatus 10 may be configured that the member such as the document cover or the document retainer is made in a gray color and a background portion outside the document at the time of reading the document is thereby read in gray. Alternatively, by expanding a reading area to be larger than an area where the document is placed, the image input device 120 may read the document and the outside (the background portion) of the document by expanding a reading range to be larger than a document placement area so as to include the outside the document. Just as described, by making a document reading background in the gray color and expanding the reading range, the image forming apparatus 10 can read the image of the document under a condition that an edge of a boundary portion between the inside/outside the document is appropriately detected.

Next, the controller 100 (the edge detector 104) detects an edge of the input image (step S102). At this time, the edge detector 104 generates a difference image and stores the difference image in the difference image storage area 164.

Next, in order to remove the streak from the input image by a first method, the controller 100 executes the first streak detection processing and first streak removal processing (step S104→step S106). In the present embodiment, a description will be made on the first method that is a method for detecting, as the streak, the edge detected near a parallel side which is parallel to the primary scanning direction in the input image so as to remove the detected streak and is a method for removing the streak by using both of the difference image in the longitudinal direction and the difference image in the transverse direction.

Furthermore, in order to remove the streak by a second method that differs from the first method, the controller 100 executes second streak detection processing and second streak removal processing (step S108→step S110). In the present embodiment, a description will be made on the second method that is a method for detecting, as the streak, the pixel included in the row in which the number of the edge pixels is larger than HIST_MAX as the threshold by using a histogram of the number of the edge pixels so as to remove the detected streak.

Just as described, the controller 100 detects the streaks from the input image by two types of the methods, and removes the streaks, each of which is detected by the respective method, from the input image. The first streak detection processing, the first streak removal processing, the second streak detection processing, and the second streak removal processing will be described in detail below.

Next, the controller 100 (the document range detector 106) detects the document range from the input image, from which the streak has been removed (step S112). Then, the controller 100 (the skew determination device 108) makes a skew determination (step S114). For example, the skew determination device 108 determines whether a skew has occurred to the document and acquires an angle of the document.

Next, the controller 100 (the image processor 102) corrects the skew and executes crop processing on the input image, from which the streak has been removed (step S116). For example, in step S114, if it is determined that the skew has occurred to the document, the image processor 102 rotates the input image by the angle of the document in an opposite direction to an inclined direction, and thereby eliminates the skew of the document. Then, the image processor 102 crops the input image on the basis of the document range detected in step S112.

Next, the controller 100 outputs the input image that has been subjected to the skew correction and the crop processing (step S118). For example, the controller 100 controls the image forming device 130 to thereby form and output the corrected input image. The controller 100 may output the corrected input image by storing data thereof in the storage device 160 or may output the corrected input image by transmitting the data thereof to another device.

1.2.2 First Streak Detection Processing

Next, a description will be made on a flow of the first streak detection processing with reference to FIG. 7. The first streak detection processing is processing to detect the row (the position) in which the streak has occurred on the basis of the difference image in the longitudinal direction. In the following description, P[r, c] represents the pixel in an r-th row and a c-th column (a pixel at coordinates (c, r)) in the difference image in the longitudinal direction.

First, the controller 100 plugs in 0 for a variable R and a variable tmp (step S200). Then, the controller 100 plugs in 0 for a variable C (Step S202).

Next, the controller 100 accesses (refers to) P[R, C] and P[R, CMAX−C] (step S204). Furthermore, the controller 100 determines whether any of a pixel value of P[R, C] and a pixel value of P[R, CMAX−C] is equal to 255, that is, whether any of P[R, C] and P[R, CMAX−C] is the edge pixel (step S206).

In the case where any of the pixel value of P[R, C] and the pixel value of P[R, CMAX−C] is equal to 255, the controller 100 stores, as the streak position information, the value of the variable R in the streak position information storage area 168 (step S206; Yes→step S208). For example, the controller 100 generates the streak position information having a value of the variable tmp as an index number and a value of the variable R as the row number, and stores the streak position information in the streak position information storage area 168.

Just as described, the controller 100 executes the processing in step S204 and step S206 and thereby detects the edges near the parallel sides (a left end and a right end of the difference image in the longitudinal direction) to the primary scanning direction by using the difference image in the longitudinal direction. More specifically, the controller 100 accesses the pixels, each of which separates from respective one of the left end and the right end of the difference image in the longitudinal direction by C pixels in the secondary scanning direction. Then, in the case where at least one of the two accessed pixels is the edge pixel, the controller 100 detects such an edge pixel as the streak. Consequently, the controller 100 stores the row that includes the streak as the streak position information.

Next, the controller 100 determines whether the value of the variable tmp is equal to ROW_STREAK_MAXSIZE (step S210). If the value of the variable tmp is equal to ROW_STREAK_MAXSIZE, the controller 100 executes error processing (step S210; Yes). For example, as the error processing, the controller 100 may cause the display device 140 to show a message indicating an error, or may terminate the processing illustrated in FIG. 7 and the processing in step S106 onward illustrated in FIG. 6. In this way, when detecting the streak whose size is equal to or larger than ROW_STREAK_MAXSIZE from the input image, the controller 100 can notify the user of information on occurrence of abnormality or the like.

On the other hand, if the value of the variable tmp is not equal to ROW_STREAK_MAXSIZE, the controller 100 plugs in a value, which is acquired by adding 1 to the value of the variable tmp, for the value of the variable tmp (step S210; No→step S212). That is, the controller 100 increments the variable tmp.

In step S206, if none of the pixel value of P[R, C] and the pixel value of P[R, CMAX−C] is 255, the controller 100 determines whether the value of the variable C is equal to SEARCH_MAX (step S206; No→step S214). If the variable C is not equal to SEARCH_MAX, the controller 100 increments the variable C, and the processing returns to step S204 (step S214; No→step S216→step S204). In this way, the controller 100 can search for the edge pixel in the secondary scanning direction from the left end and the right end of the difference image in the longitudinal direction by executing the processing in step S204 and step S206 while incrementing the variable C.

After execution of the processing in step S212 or, in step S214, if the controller 100 determines that the value of the variable C is equal to SEARCH_MAX (step S214; Yes), the controller 100 determines whether the value of the variable R is equal to RMAX (step S218). RMAX is a maximum value (a row width) of the row number in the difference image in the longitudinal direction.

Figure 7:
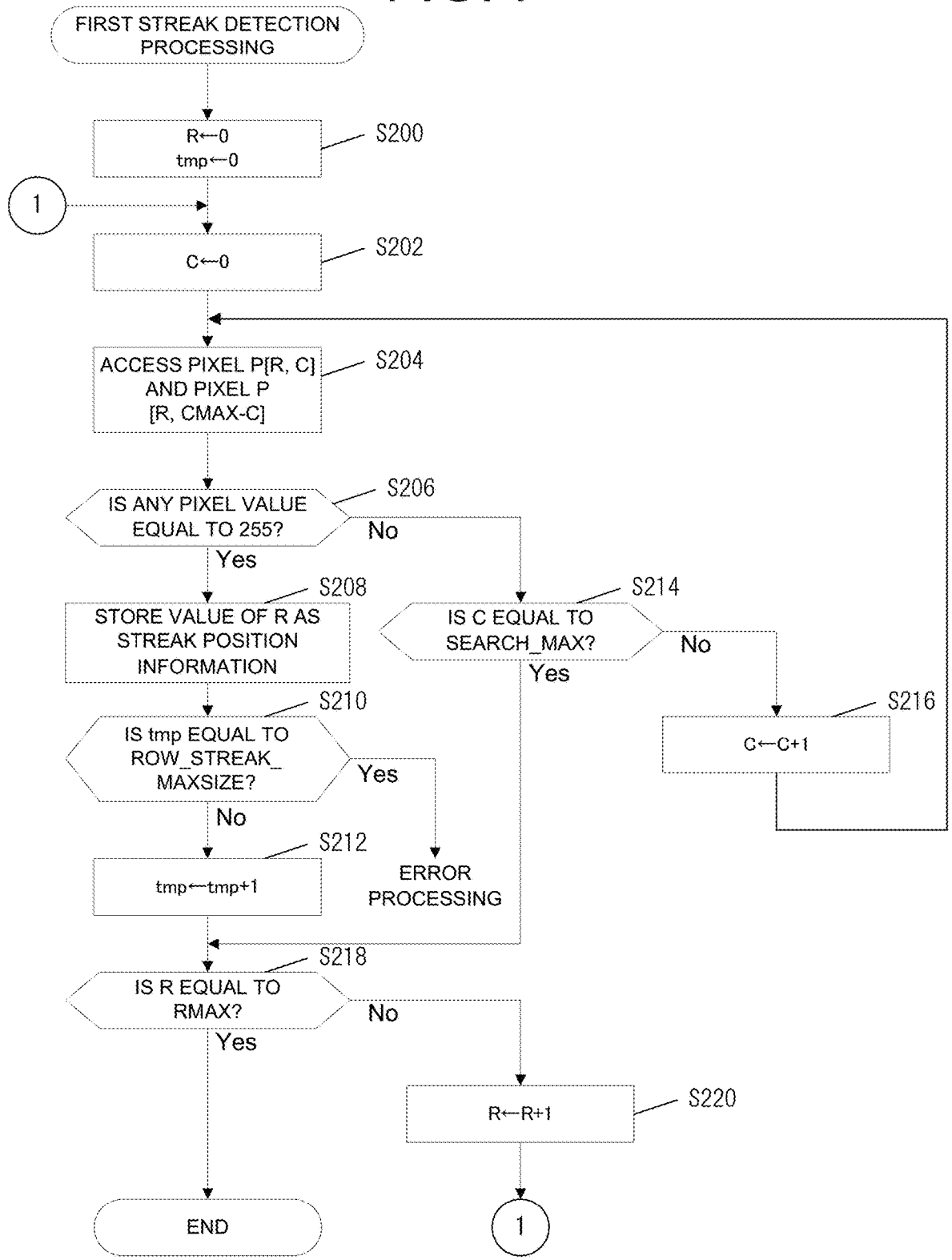
FIG. 7 is a flowchart illustrating a flow of first streak detection processing in the first embodiment.

If the value of the variable R is equal to RMAX, the controller 100 terminates the processing illustrated in FIG. 7 (Step S218; Yes). On the other hand, if the value of the variable R is not equal to RMAX, the controller 100 increments the variable R, and the processing returns to step S202 (step S218; No→step S220→step S202).

1.2.3 First Streak Removal Processing

Next, a description will be made on a flow of the first streak removal processing with reference to FIG. 8. The first streak removal processing is processing to remove the streak, which is detected by the first streak detection processing, by using both of the difference image in the longitudinal direction and the difference image in the transverse direction. In the following description, the pixel P[R, C] indicates a pixel in an R-th row and a C-th column in the difference image in the longitudinal direction, and a pixel Q[R, C] indicates a pixel in the R-th row and the C-th column in the difference image in the transverse direction.

First, the controller 100 plugs in 0 for the variable tmp (step S300). Then, the controller 100 acquires the streak position information with the index number as tmp from the streak position information storage area 168 (step S302), and plugs in a value of the row number, which is included in the acquired streak position information, for the variable R (step S304).

Next, the controller 100 plugs in 0 for the variable C (step S306), and accesses the pixel P[R, C] (step S308). Furthermore, the controller 100 accesses the pixel Q[R, C] and determines whether the pixel value of the pixel Q[R, C] is equal to 255, that is, whether the pixel Q[R, C] is the edge pixel (step S310).

If the pixel value of the pixel Q[R, C] is not equal to 255, the controller 100 plugs in 0 for the pixel value of the pixel P[R, C] (step S310; No→step S312). That is, the controller 100 replaces the pixel in the R-th row and the C-th column with the pixel other than the edge pixel.

At this time, the controller 100 reads out the input image, which has been acquired in step S100, from the input image storage area 162, and replaces the pixel at a position in the R-th row and the C-th column of the input image with the pixel in a color that is based on a color of the surrounding pixel. For example, the controller 100 plugs in the pixel value corresponding to a color of the surface of the input document or an average value of the surrounding pixel values for the pixel value of the pixel at the position in the R-th row and the C-th column of the input image, so as to replace the color of the pixel at the position in the input image. In this way, even when the pixel at the position in the R-th row and the C-th column of the input image is the edge pixel, the controller 100 can remove the edge pixel by replacing the color of the edge pixel.

In the case where the pixel at the position in the R-th row and the C-th column is 255 in the difference image in the longitudinal direction (in the case where the pixel is the edge pixel), the controller 100 may change the pixel value of the pixel at the position in the R-th row and the C-th column of the input image. In this way, only in the case where the pixel in the R-th row and the C-th column of the input image is the edge pixel, the controller 100 can replace the color of the edge pixel.

Next, the controller 100 increments the value of the variable C (step S314), and determines whether the value of the variable C is equal to SEARCH_STOP (step S316). If the value of the variable C is not equal to SEARCH_STOP, the processing returns to step S308 (step S316; No→step S308).

Just as described, while incrementing the value of the variable C, in step S310, the controller 100 determines whether the pixel value of the pixel Q[R, C] is equal to 255. Here, in the case where the pixel value of the pixel Q[R, C] is 255, it is considered that such a pixel is the edge corresponding to the left side of the document. Accordingly, by the processing in step S310, the controller 100 detects, as the pixel at the left end of the document, the edge pixel that is located at the position closest to the end (the left end) of the difference image in the transverse direction. In addition, the controller 100 repeatedly executes step S312 until detecting the left end of the document. In this way, the controller 100 replaces the pixels, which are included from the parallel side (the left end) to the primary scanning direction to the position at the end (the left end) of the document, among the pixels including the streak in the R-th row to other pixels. In this way, in a left portion of the input image, the controller 100 can replace only the pixels outside the document to other pixels.

On the other hand, if the value of the variable C is equal to SEARCH_STOP, the controller 100 plugs in 0 for the variable C (step S316; Yes→step S318). Also, in step S310, if the controller 100 determines that the value of the pixel value Q[R, C] is equal to 255, the controller 100 executes the processing in step S316 (Step S310; Yes→Step S318).

Next, the controller 100 accesses the pixel P[R, CMAX−C] (step S320). Then, the controller 100 accesses the pixel Q[R, CMAX−C] and determines whether the pixel value of the pixel Q[R, CMAX−C] is equal to 255 (step S322).

If the pixel value of the pixel Q[R, CMAX−C] is not equal to 255, the controller 100 plugs in 0 for the pixel value of the pixel P[R, CMAX−C] (step S322; No→step S324). The processing in step S324 is similar processing to the processing in Step S312.

Next, the controller 100 increments the value of the variable C (step S326), and determines whether the value of the variable C is equal to SEARCH_STOP (step S328). If the value of the variable C is not equal to SEARCH_STOP, the processing returns to step S320 (step S328; No→step S320).

Just as described, while incrementing the value of the variable C, in step S322, the controller 100 determines whether the pixel value of the pixel Q[R, CMAX−C] is equal to 255. In this way, the controller 100 detects, as the pixel at the right end of the document, the edge pixel that is closest to the end (the right end) of the difference image in the transverse direction. In addition, the controller 100 repeatedly executes step S324 until detecting the right end of the document. In this way, the controller 100 replaces the pixels, which are included from the parallel side (the right end) to the primary scanning direction to the position at the end (the right end) of the document, among the pixels including the streak in the R-th row to other pixels. In this way, in a right portion of the input image, the controller 100 can replace only the pixels outside the document to other pixels. Furthermore, the controller 100 executes the processing to replace the pixels in each of the left portion and the right portion of the input image until detecting the respective end of the document. In this way, even in the case where the position of the end of the document differs between the left portion and the right portion of the input image, the controller 100 can appropriately remove the streak outside the document.

On the other hand, if the value of the variable C is equal to SEARCH_STOP, the controller 100 determines whether the value, which is acquired by adding 1 to the value of the variable tmp, is equal to the total number of the streak position information stored in the streak position information storage area 168 (step S328; Yes→step S330). Also, in step S322, if the controller 100 determines that the value of the pixel value Q[R, CMAX–C] is equal to 255, the controller 100 executes the processing in step S330 (Step S322; Yes→Step S330).

Figure 8:
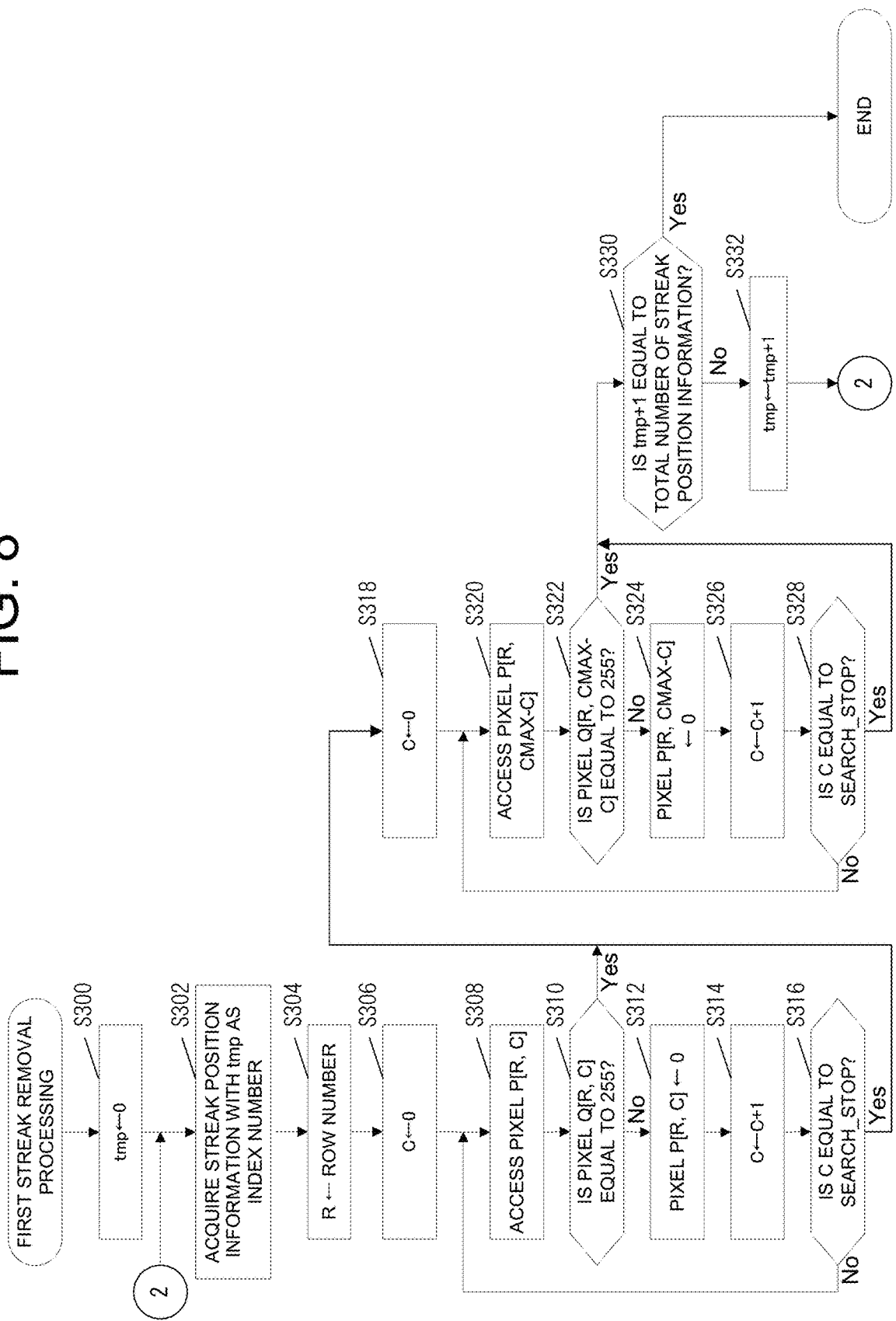
FIG. 8 is a flowchart illustrating a flow of first streak removal processing in the first embodiment.

If the value, which is acquired by adding 1 to the value of the variable tmp, is equal to the total number of the streak position information stored in the streak position information storage area 168, the controller 100 terminates the processing illustrated in FIG. 8 (step S330; Yes). On the other hand, if the value, which is acquired by adding 1 to the value of the variable tmp, is not equal to the total number of the streak position information stored in the streak position information storage area 168, the controller 100 increments the variable tmp, and then the processing returns to step S302 (step S330; No→step S332→step S302).

1.2.4 Second Streak Detection Processing

Figure 9:
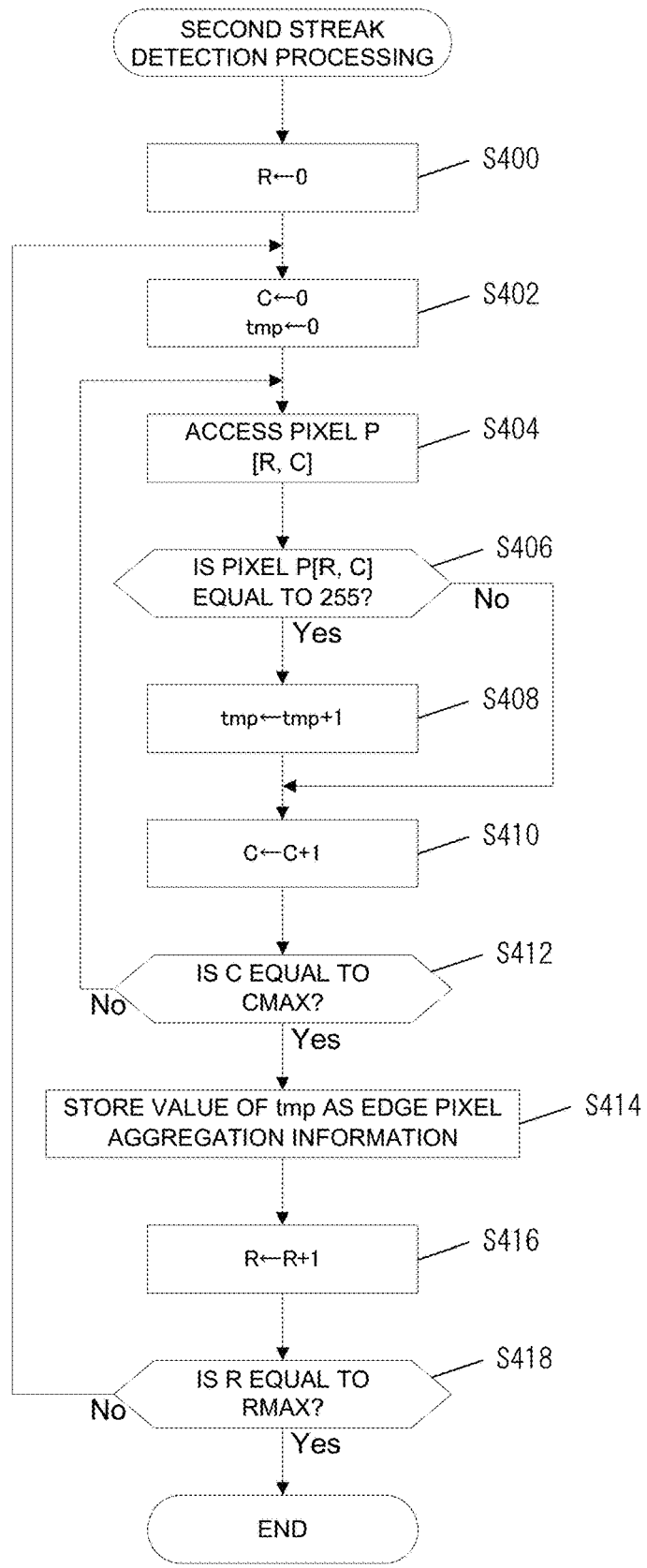
FIG. 9 is a flowchart illustrating a flow of second streak detection processing in the first embodiment.

Next, a description will be made on a flow of the second streak detection processing with reference to FIG. 9. The second streak detection processing is processing to generate the histogram of the number of the edge pixels per row. In the following description, the pixel P[R, C] represents the pixel in the R-th row and the C-th column in the difference image in the longitudinal direction.

First, the controller 100 plugs in 0 for the variable R (step S400). Then, the controller 100 plugs in 0 for the variable C and the variable tmp (step S402).

Next, the controller 100 accesses the pixel P[R, C] (step S404), and determines whether the pixel value of the pixel P[R, C] is equal to 255 (step S406).

If the pixel value of the pixel P[R, C] is equal to 255, the controller 100 increments the variable tmp (step S406; Yes→step S408). On the other hand, if the pixel value of the pixel P[R, C] is not equal to 255, the controller 100 skips the processing in step S408 (step S406; No). More specifically, the controller 100 aggregates the number of the edge pixels, which are detected from the difference image in the longitudinal direction, per position (row) in the secondary scanning direction.

Next, the controller 100 increments the variable C (step S410), and determines whether the value of the variable C is equal to CMAX (step S412). If the value of the variable C is not equal to CMAX, the processing returns to step S404 (step S412; No→step S404).

On the other hand, if the value of the variable C is equal to CMAX, the controller 100 stores, as the edge pixel aggregation information, the value of the variable tmp in the edge pixel aggregation information storage area 170 (step S414). For example, the controller 100 generates the edge pixel aggregation information having the value of the variable R as the row number and the value of the variable tmp as the number of the edge pixels, and stores the edge pixel aggregation information in the edge pixel aggregation information storage area 170. In this way, the number of the edge pixels per row is stored as the edge pixel aggregation information. In addition, the edge pixel aggregation information that is stored in the edge pixel aggregation information storage area 170 serves as information on the histogram of the number of the edge pixels.

Next, the controller 100 increments the variable R (step S416), and determines whether the value of the variable R is equal to RMAX (step S418). If the value of the variable R is equal to RMAX, the controller 100 terminates the processing illustrated in FIG. 9 (Step S418; Yes). On the other hand, if the value of the variable R is not equal to RMAX, the processing returns to step S402 (step S418; No→step S402).

1.2.5 Second Streak Removal Processing

Next, a description will be made on a flow of the second streak removal processing with reference to FIG. 10. The second streak removal processing is processing to detect the row (the position) in which the streak has occurred on the basis of the histogram generated by the second streak detection processing and thereby remove the detected streak. In the following description, the pixel P[R, C] represents the pixel in the R-th row and the C-th column in the difference image in the longitudinal direction.

First, the controller 100 plugs in 0 for the variable R (step S500). Then, the controller 100 plugs in 0 for the variable C (Step S502).

Next, the controller 100 determines whether the number of the edge pixels in the R-th row is larger than HIST_MAX (step S504). In the case where the number of the edge pixels in the R-th row is larger than HIST_MAX, the controller 100 determines that the streak has occurred in the R-th row of the input image, and detects the pixels included in the R-th row as the streak.

If the number of the edge pixels in the R-th row is larger than HIST_MAX, the controller 100 accesses the pixel P[R, C] (step S504; Yes→step S506), and plugs in 0 for the pixel value of the pixel P[R, C] (step S508). The processing in step S508 is the same as the process in step S312 illustrated in FIG. 8. Furthermore, the controller 100 increments the variable C (step S510).

Next, the controller 100 determines whether the value of the variable C is equal to CMAX (step S512). If the value of the variable C is not equal to CMAX, the processing returns to step S506 (step S512; No→step S506).

Just as described, the controller 100 repeatedly executes the processing in step S506 to step S510. In this way, the controller 100 can replace the pixel, which is included in the row having the detected streak, with another pixel. In this way, even when the pixel included in the row having the detected streak is the edge pixel, the controller 100 can remove the edge pixel by replacing the color of the edge pixel.

On the other hand, if the number of the edge pixels in the R-th row is equal to or smaller than HIST_MAX in step S504, the controller 100 skips the processing in step S506 to step S512 described above (step S504; No).

Next, the controller 100 increments the variable R (step S514), and determines whether the value of the variable R is equal to RMAX (step S516). If the value of the variable R is equal to RMAX, the controller 100 terminates the processing illustrated in FIG. 10 (Step S516; Yes). On the other hand, if the value of the variable R is not equal to RMAX, the processing returns to step S502 (step S516; No→step S502).

1.3 Operation Example

Figure 29A:
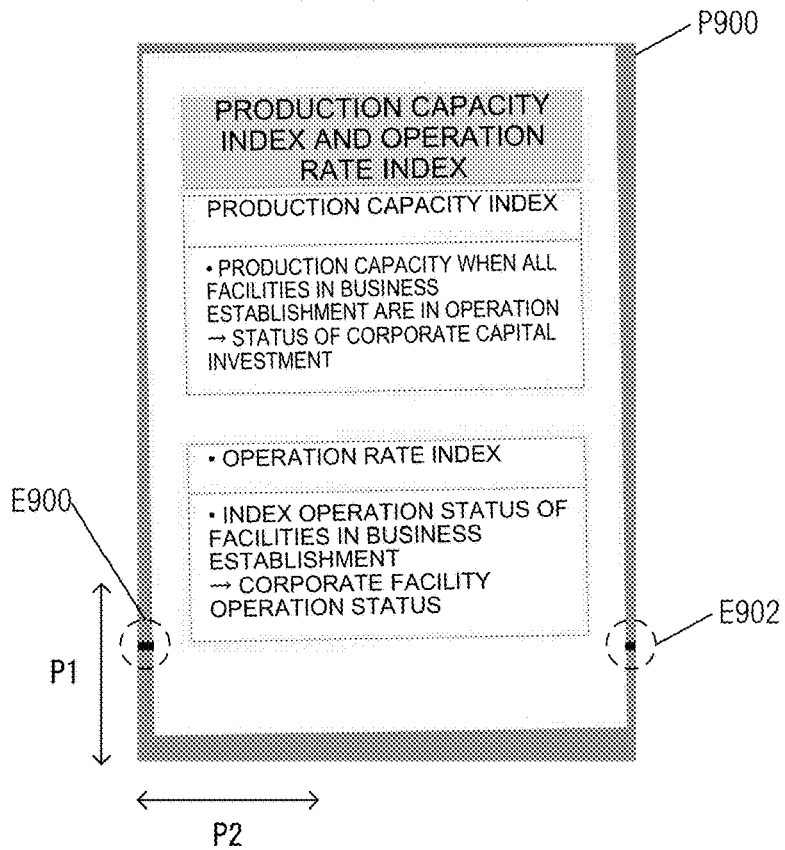
FIGS. 29A and 29B are views, each of which illustrates an example of the related art.
Figure 29B:
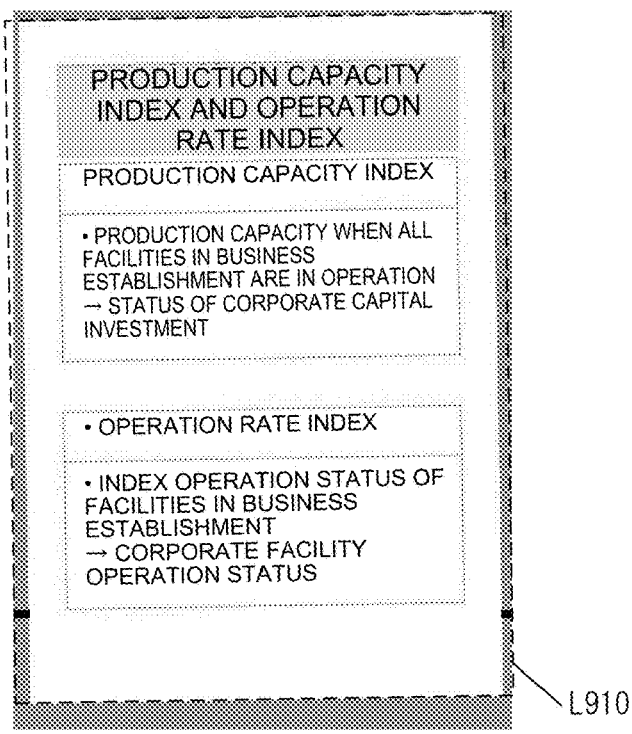

Next, a description will be made on an operation example in the present embodiment. In the description of the operation example, a description will be made on a case where a scanned image P900 illustrated in FIG. 29A is acquired as the input image.

Figure 11A:
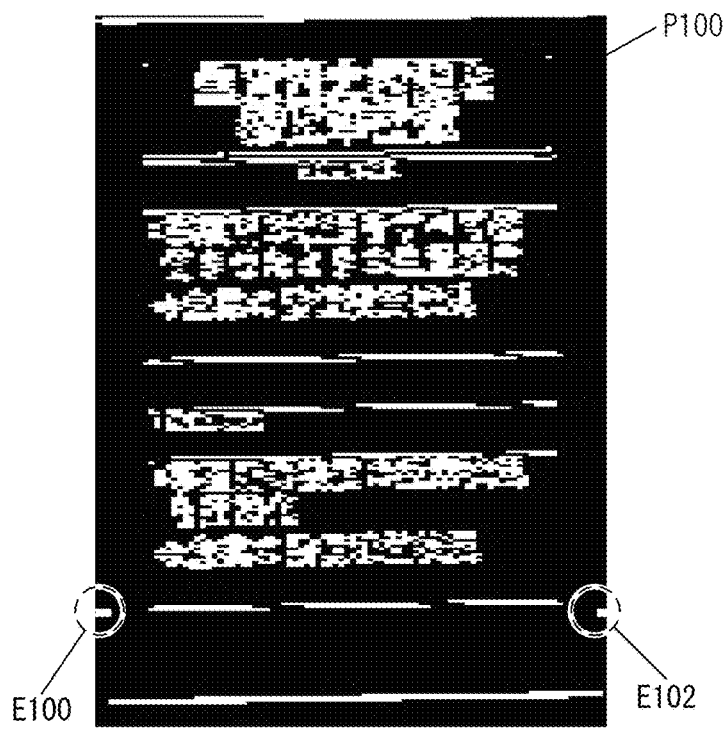
FIGS. 11A and 11B are views illustrating an operation example in the first embodiment.
Figure 11B:
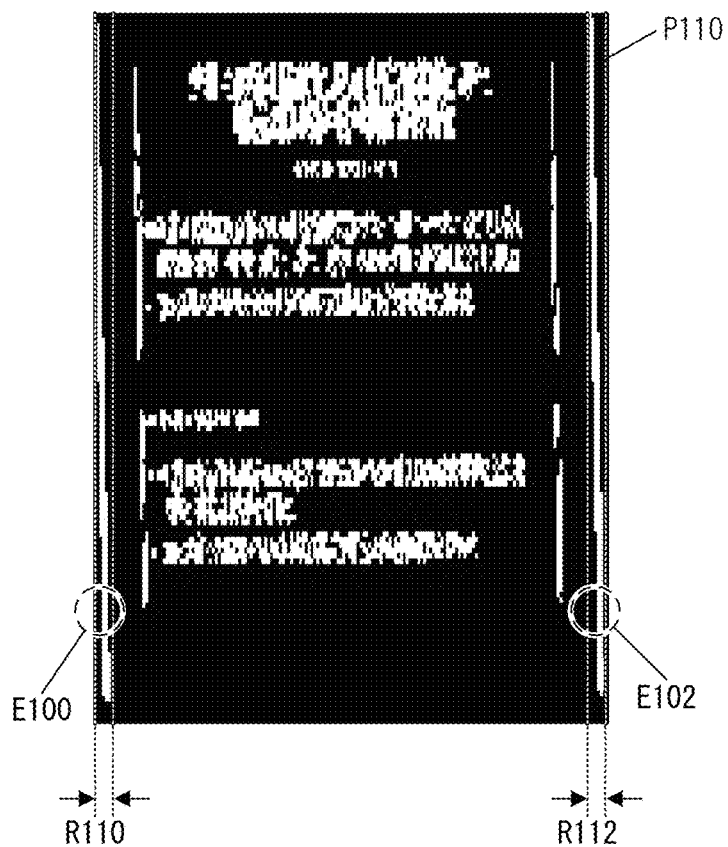

FIGS. 11A and 11B are views illustrating the difference image of the input image. FIG. 11A illustrates a difference image P100 in the longitudinal direction of the scanned image P900. E100 and E102 in FIG. 11A respectively denote edge pixels of E900, E902, each of which is streak-like noise appearing in the scanned image P900. Just as described, the streak-like noise that appears in the input image is indicated as the edge pixel in the difference image in the longitudinal direction. The row (the position) in which the streak has occurred is detected on the basis of the edge pixels in the difference image in the longitudinal direction.

FIG. 11B illustrates a difference image P110 in the longitudinal direction of the scanned image P900. Each of an area R110 and an area R112 in FIG. 11B is a range including the edge pixels of the document. In the present embodiment, the range of the edge pixels (the streak) to be removed is determined in accordance with a state of the pixels (the pixels in each of E100 and E102 in FIG. 11B) of the difference image in the transverse direction, the pixels corresponding to the row in which the streak is detected.

Figure 12A:
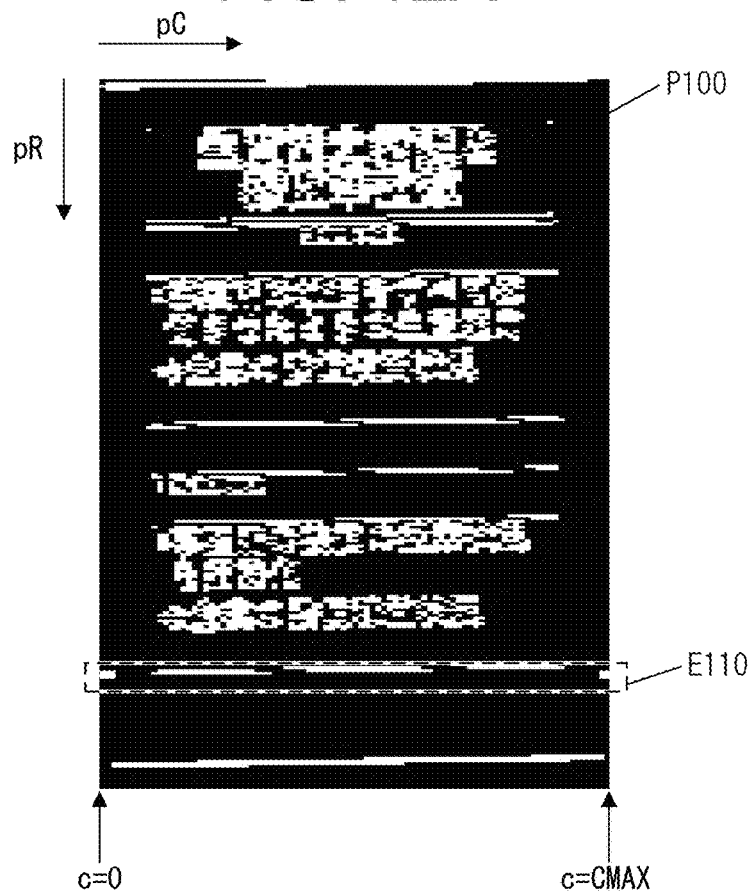
FIGS. 12A and 12B are views illustrating the operation example in the first embodiment.

FIG. 12A is a view illustrating an area E110 including the edge pixels in the difference image P100 illustrated in FIG. 11A. In FIG. 12A, pR denotes a direction of the rows, and pC denotes a direction of the columns. In the following description, the row number of the pixel of interest will be denoted by r, and the column number of the pixel of interest will be denoted by c. Here, as illustrated in FIG. 12A, a position of c=0 is the position of the left end of the difference image in the longitudinal direction, and a position of c=CMAX is the position of the right end of the difference image in the longitudinal direction.

Figure 12B:
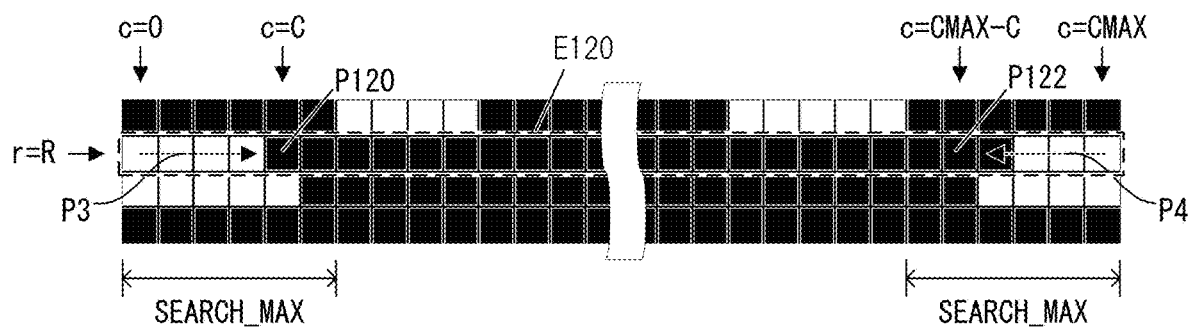

FIG. 12B is a view illustrating an operation example in the first streak detection processing. When the row of interest is the R-th row (r=R), the edge pixel is searched from the pixels (the pixel group in the R-th row) that are included in E120 illustrated FIG. 12B. At this time, the pixel P[R, C] and the pixel P[R, CMAX−C] are accessed while the value of the variable C changes from 0 to SEARCH_MAX. Consequently, the edge pixel is searched in a direction P3 from the pixel at the left end (c=0) of the difference image in the longitudinal direction, and the edge pixel is also searched in a direction P4 from the pixel at the right end (c=CMAX) of the difference image in the longitudinal direction. For example, when the column of interest is the C-th column (c=C), in the R-th row, it is determined whether each of a pixel P120 located in the C-th column and a pixel P122 located in a (CMAX−C)-th column is the edge pixel. In addition, in the case where the edge pixel is detected while the value of the variable C changes from 0 to SEARCH_MAX, the row number (the value of the variable R) in which the edge pixel is present is stored as the streak position information.

Figure 13A:
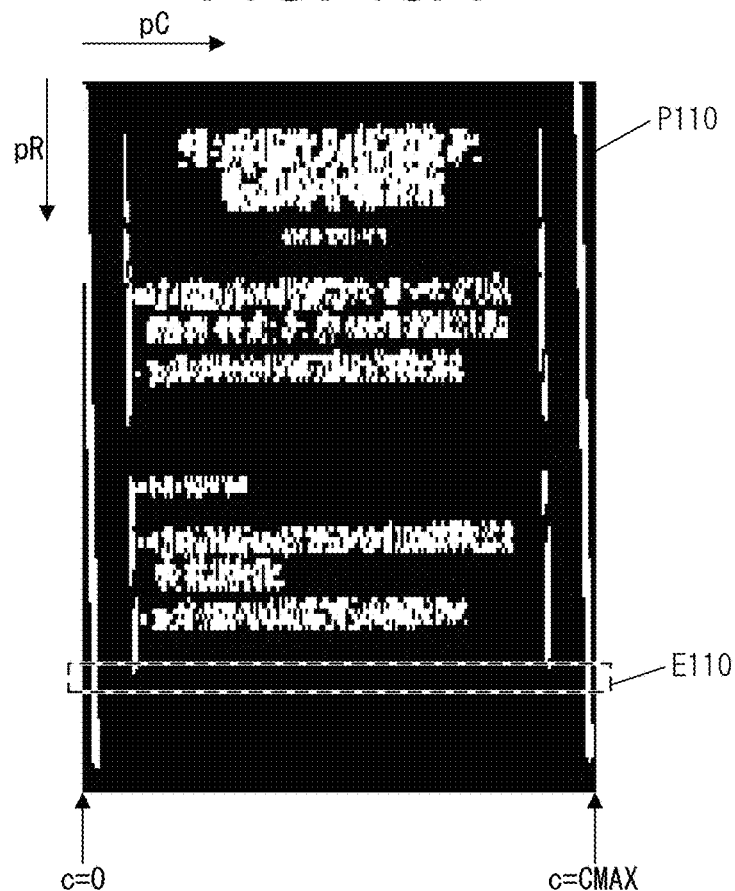
FIGS. 13A and 13B are views illustrating the operation example in the first embodiment.
Figure 13B:
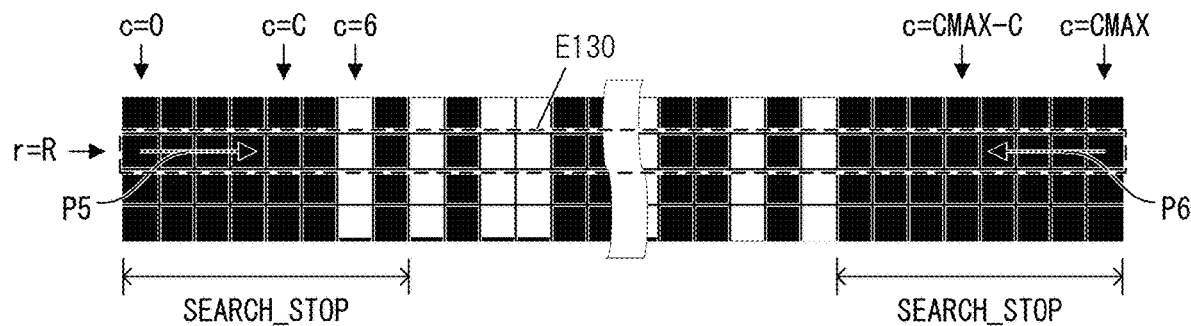

FIGS. 13A and 13B are views illustrating an operation example of determining the range where the edge pixel (the streak) is deleted in the first streak removal processing. FIG. 13A is a view illustrating positions corresponding to the difference image P110 in the transverse direction illustrated in FIG. 11B and the area E110 illustrated in FIG. 12A. In FIG. 13A, pR denotes the direction of the rows, and pC denotes the direction of the columns. In addition, the position of c=0 is the position of the left end of the difference image in the transverse direction, and the position of c=CMAX is the position of the right end of the difference image in the transverse direction. The position of c=0 and the position of c=CMAX are the same among the difference image in the longitudinal direction and the difference image in the transverse direction.

FIG. 13B is an enlarged view of the area E110 illustrated in FIG. 13A. In the first streak removal processing, the edge pixel is searched in a direction P5 from the pixels in the row in which the edge pixel is present. For example, when the row in which the edge pixel is present is the R-th row (r=R), the edge pixel is searched from the pixels (the pixel group in the R-th row) that are included in E130 illustrated FIG. 13B.

First, when the value of the variable C changes from 0 to SEARCH_STOP, the edge pixel is searched in the direction P5 from the pixel at the left end (c=0) of the difference image in the transverse direction. At this time, until the edge pixel is found, the pixel in the R-th row and the C-th column in the input image is replaced with the pixel in the color that is based on the color of the surrounding pixels. In the example illustrated FIG. 13B, the edge pixel is present at a position of c=6. Thus, in the input image, the pixels located from c=0 to c=5 in the R-th row are replaced with the pixels in the color that is based on the color of the surrounding pixels.

Next, when the value of the variable C changes from 0 to SEARCH_STOP, the edge pixel is searched in a direction P6 from the pixel at the right end (c=CMAX) of the difference image in the transverse direction. At this time, until the edge pixel is found, the pixel in the R-th row and the (CMAX−C)th column in the input image is replaced with the pixel in the color that is based on the color of the surrounding pixels. In the example illustrated FIG. 13B, the edge pixel is not present from the position of c=CMAX to a position of c=CMAX−SEARCH_STOP. Thus, in the input image, the pixels located from c=CMAX to c=CMAX−SEARCH_STOP in the R-th row are replaced with the pixels in the color that is based on the color of the surrounding pixels.

Figure 14:
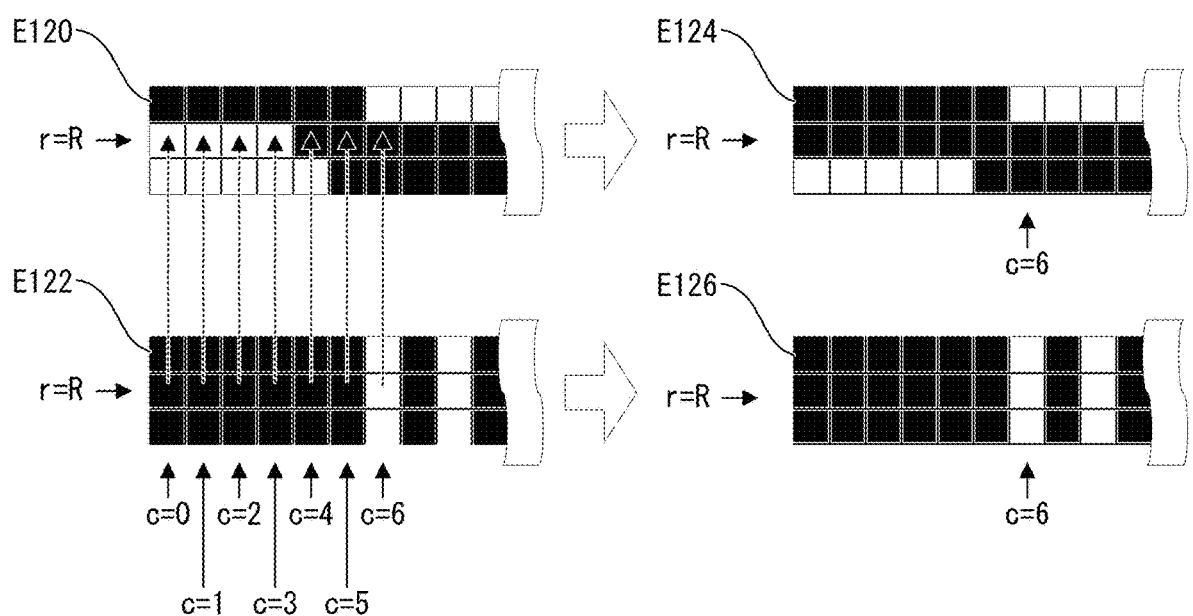
FIG. 14 is a view illustrating the operation example in the first embodiment.

FIG. 14 is a view illustrating an operation example in the first streak removal processing. E120 and E124 in FIG. 14 each illustrate an example of the difference image in the longitudinal direction. In addition, E122 and E126 in FIG. 14 each illustrate the difference image in the transverse direction. Furthermore, E120 and E122 each illustrate the difference image before the execution of the first streak removal processing, and E124 and E126 each illustrate the difference image after the execution of the first streak removal processing.

As illustrated in E120, in the difference image in the longitudinal direction, the edge pixels are included at the positions of c=0 to c=3 in the row of r=R. Thus, the streak is detected in the row of r=R. Meanwhile, as illustrated in E122, in the difference image in the transverse direction, the edge pixel appears in the row of r=R and the column of c=6. Thus, in the row of r=R, the edge pixels that appear from c=0 to C=5 are removed.

In this way, as illustrated in the E124 in FIG. 14, the edge pixels that are present from c=0 to C=5 are removed in the row of r=R. Since the difference image in the transverse direction is only referred for the removal of the streak, there is no change before and after the removal of the streak as illustrated in E122 and E126.

Figure 15A:
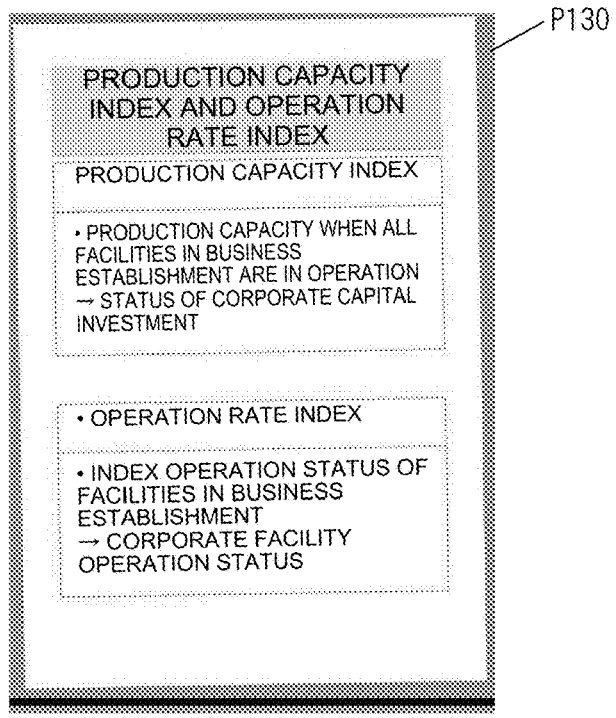
FIGS. 15A, 15B, and 15C are views illustrating the operation example in the first embodiment.
Figure 15B:
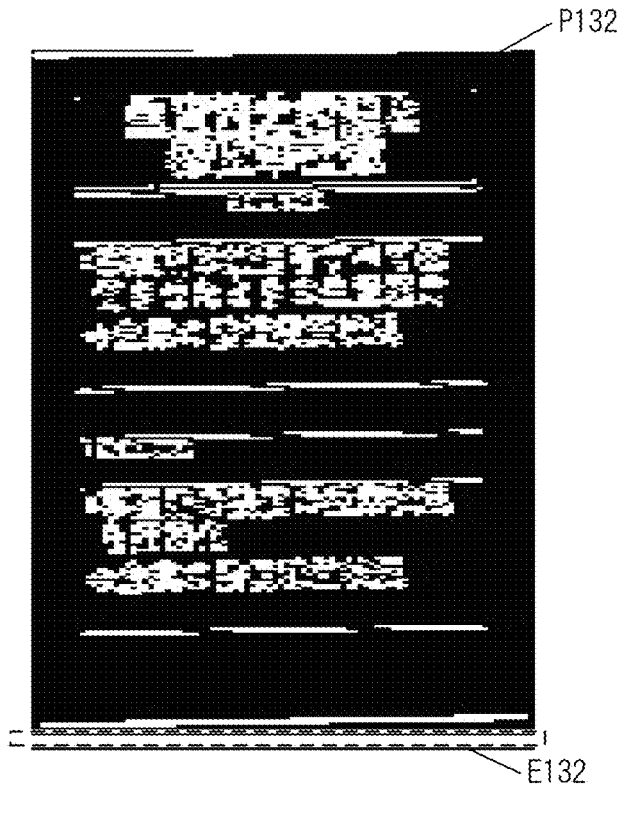
Figure 15C:
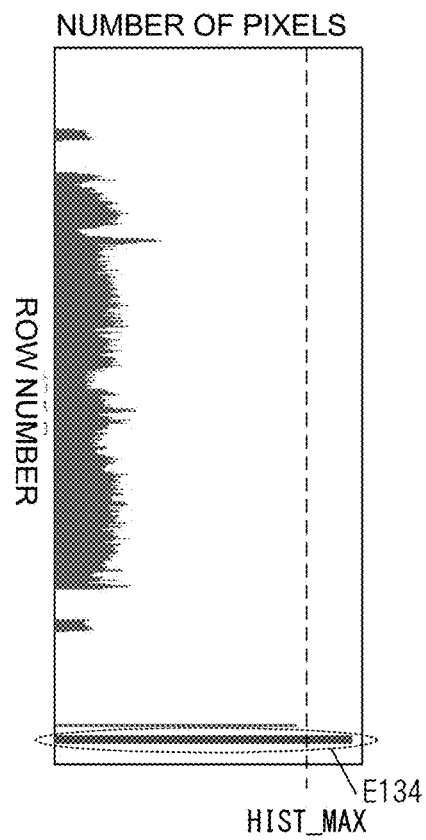

FIGS. 15A, 15B, and 15C are views illustrating an operation example in the second streak detection processing. FIG. 15A is a view illustrating an example of an input image P130. FIG. 15B is a view illustrating a difference image P132 in the longitudinal direction of the input image P130. Here, as indicated by E132 in the difference image P132, the edge pixels appear in the transverse direction from one end to the other end of the input image.

FIG. 15C is a histogram illustrating the number of the edge pixels per row in the difference image P132. A vertical axis of the histogram represents the row number, and a horizontal axis thereof represents the number of the pixels that are included in the row corresponding to the row number. In addition, a dotted line in FIG. 15C indicates the number of the pixels corresponding to HIST_MAX. Here, as indicated by E134, the number of the edge pixels in the row indicated by E132 in FIG. 15B is larger than HIST_MAX. Thus, the streak is detected from the row that corresponds to the E132 in FIG. 15B.

Figure 16:
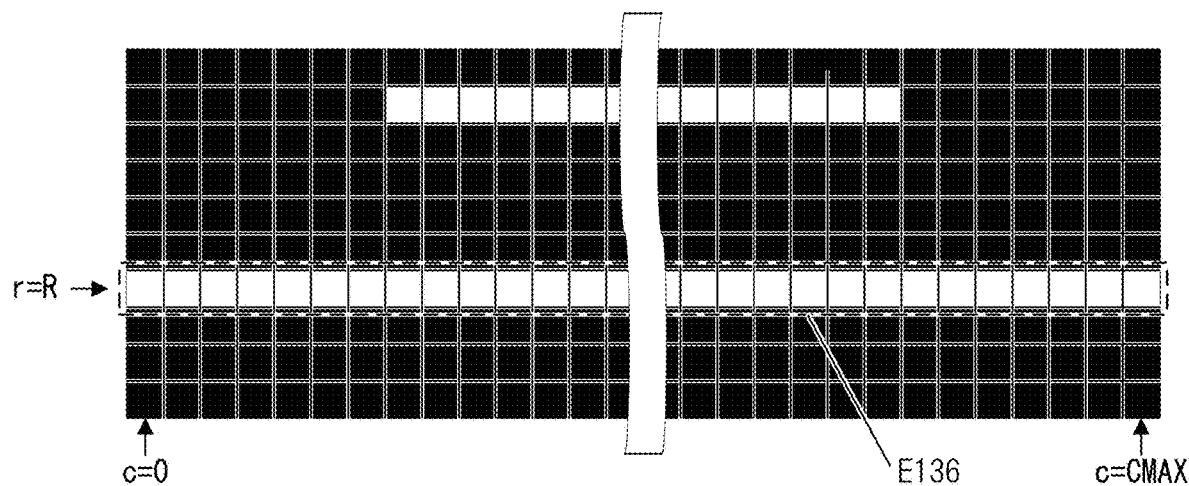
FIG. 16 is a view illustrating the operation example in the first embodiment.

FIG. 16 is a view illustrating an operation example in the second streak removal processing. FIG. 16 is an enlarged view of the portion E132 in FIG. 15B. Here, in the second streak detection processing, it is assumed that the row number of the row in which the number of the pixels is larger than HIST_MAX is R. In this case, the edge pixels are collectively removed from the pixel group (E136 in FIG. 16) included in the R-th row.

Figure 17A:
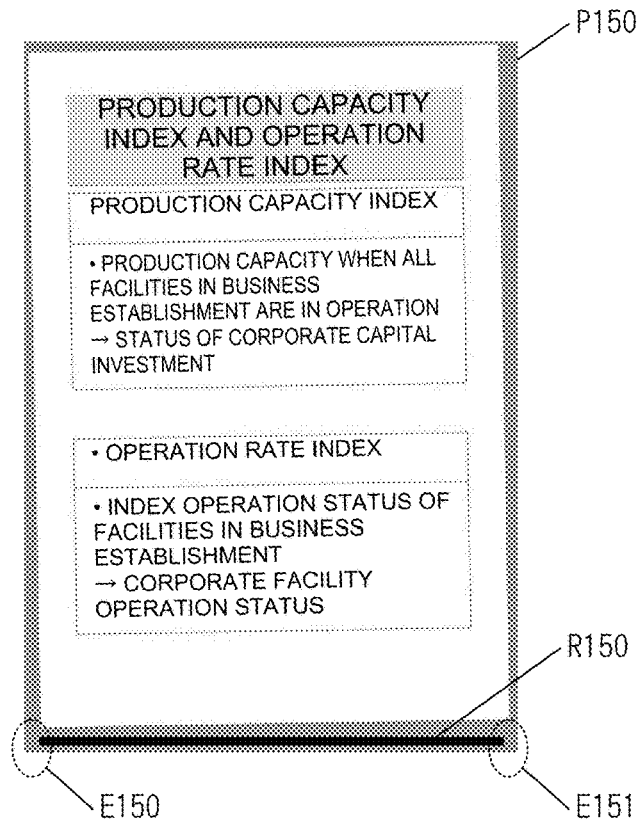
FIGS. 17A and 17B are views illustrating the operation example in the first embodiment.
Figure 17B:
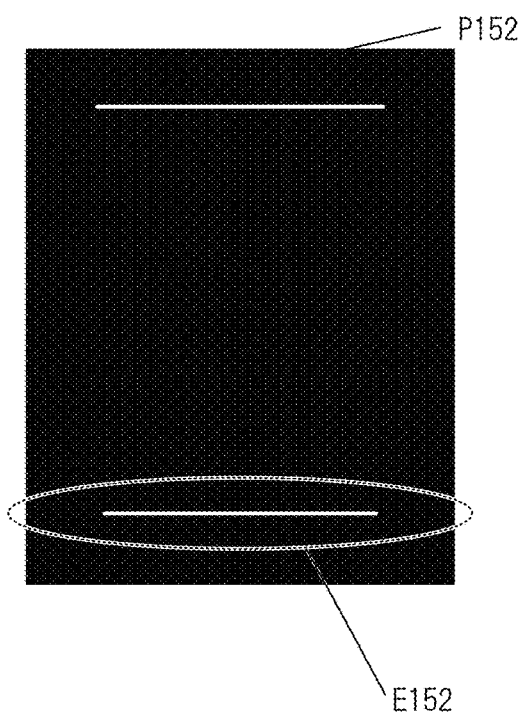

FIGS. 17A and 17B are views illustrating an advantage of using the two streak detection methods. FIG. 17A is a view illustrating an example of the streak that is not detected in the first streak detection processing but detected in the second streak detection processing. FIG. 17A is a view illustrating an example of an input image P150. A streak R150 appears in the input image P150. However, as indicated by E150 and E151 in FIG. 17A, a streak occurrence portion separates from the end of the input image (the scanned image) by SEARCH_MAX or more. In this case, the streak R150 is not detected in the first streak detection processing.

In general, due to characteristics of the scanner, the streak frequently occurs from the end of the input image. However, due to an optical condition of the scanner, the streak occurs at a position away from the end of the input image in rare cases. In this case, even when the edge of the streak is searched from the end of the input image as in the first streak detection processing, the position of the streak is not detected. As a result, the streak is not removed. However, by using the method using the histogram as in the second streak detection processing, the position of the streak can be detected even when the streak does not occur from the end of the input image. The thus-detected streak is removed by the second streak removal processing.

In addition, when the edge of the streak is searched from the end of the input image by the first streak detection processing, only the edge of the streak can be removed without removing the edge of the document. Furthermore, even when the edge of the document overlaps the streak, the edge of the document can be left.

Figure 30A:
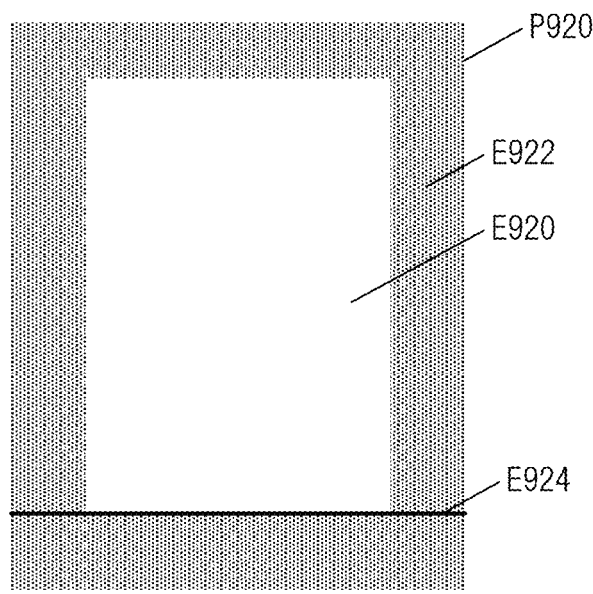
FIGS. 30A, 30B, and 30C are views, each of which illustrates an example of the related art.
Figure 30B:
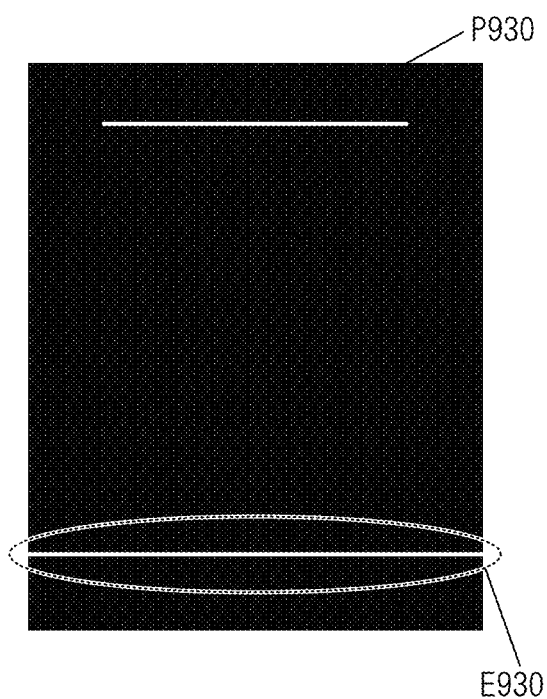
Figure 30C:
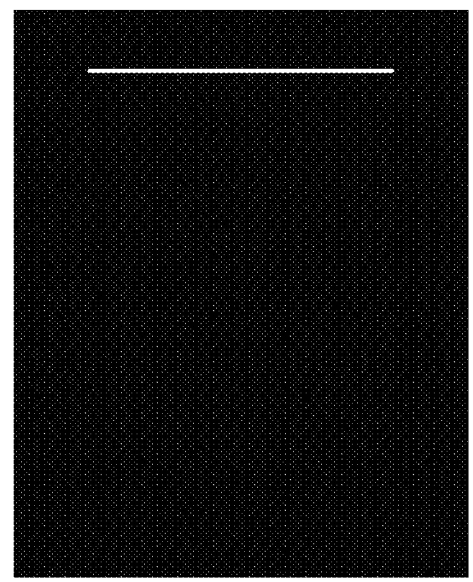

For example, FIG. 17B is a view illustrating a difference image P152 in the longitudinal direction after the first streak removal processing and the second streak removal processing are executed on the difference image in the longitudinal direction illustrated in FIG. 30B. In the first streak removal processing, the edge pixels of the streak, which has occurred to E930 in FIG. 30B, are removed from the end of the input image to the position of the edge pixel of the document or the position of SEARCH_STOP. At this time, in regard to the streak that has occurred to E930, at a maximum, the number of the removed edge pixels is the number of SEARCH_STOP×2. Subsequently, the streak is detected by the second streak detection processing. However, in the case where the number of the edge pixels in E930 (CMAX−SEARCH_STOP×2 at the maximum) is smaller than HIST_MAX, the streak is not detected from the row (the position) of E930. As a result, as indicated by E152 in FIG. 17B, the edge pixels on the lower side of the document are partially left in the difference image after the second streak removal processing. Since the edge pixels of the document remain, subsequent image processing is not adversely affected.

FIG. 18 illustrates an example of the processing in the image forming apparatus 10 in the present embodiment. The streaks occur to ends of the input image P160. At this time, a difference image P162 in the longitudinal direction and a difference image P164 in the transverse direction are acquired by edge detection processing. By the first streak detection processing, positions of a streak E160 and a streak E161 are detected, and the streaks are removed on the basis of the difference image P164 in the transverse direction. That is, the difference image P164 in the transverse direction is indirectly used in order to search for the range where the streak is removed. As a result, the streaks that have occurred outside the document are removed, and a difference image P166 in the longitudinal direction is acquired. In the difference image P166 in the longitudinal direction, there is no row in which the number of the edge pixels is equal to or larger than HIST_MAX. Thus, the streak is not detected in the second streak detection processing, and a difference image P168 in the longitudinal direction is acquired after the execution of the second streak removal processing. In this way, the streak E160 and the streak E161 that have occurred outside the document are removed from the input image P160.

Figure 19:
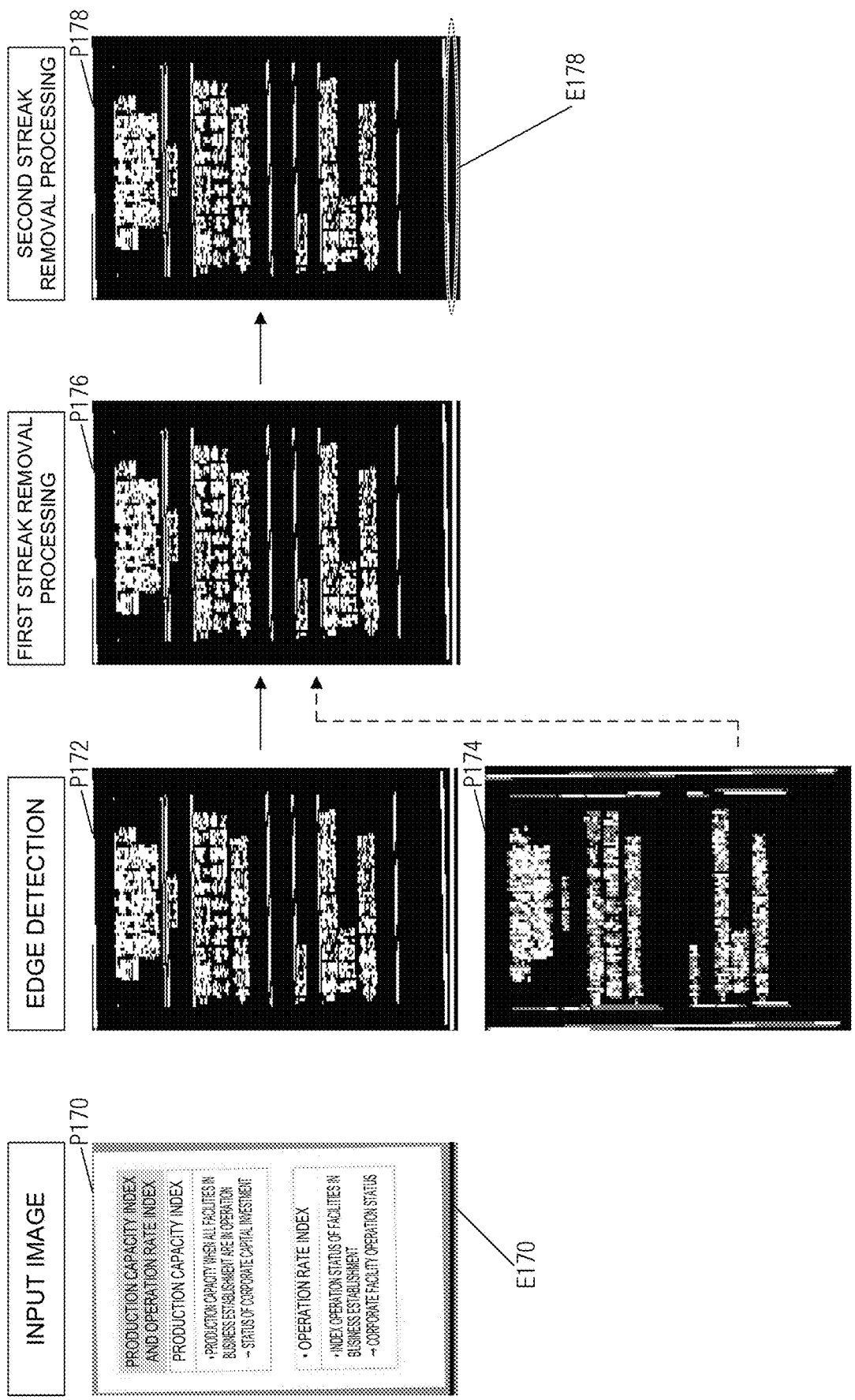
FIG. 19 is a view illustrating the operation example in the first embodiment.
Figure 20:
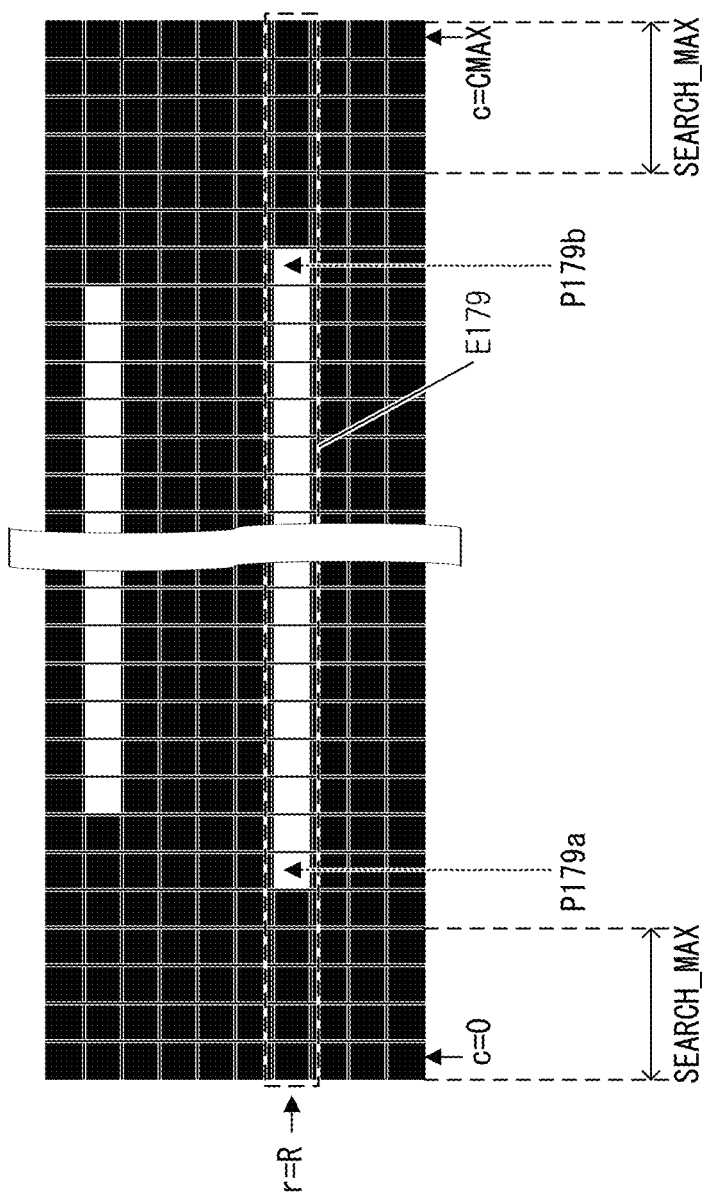
FIG. 20 is a view illustrating the operation example in the first embodiment.

FIG. 19 illustrates another example of the processing in the image forming apparatus 10 in the present embodiment. A streak E170 occur to an input image P170. At this time, a difference image P172 in the longitudinal direction and a difference image P174 in the transverse direction are acquired by the edge detection processing. Here, as illustrated in FIG. 20, there is a case where the following (1) and (2) are satisfied in the pixel group of the R-th row (the pixels included in E179 in FIG. 20).

(1) A position of an edge pixel P179a, which is the pixel at the left end of the streak, is located to the right of SEARCH_MAX. That is, the value of c indicating the position of the edge pixel P179a in the transverse direction is larger than SEARCH_MAX.

(2) A position of an edge pixel P179b, which is the pixel at the right end of the streak, is located to the left of (CMAX−SEARCH_MAX). That is, the value of c indicating the position of the edge pixel P179b in the transverse direction is smaller than (CMAX−SEARCH_MAX).

In such a case, the streak that has occurred in the R-th row is not removed by the first streak removal processing.

In the case where the streak E170 is not removed by the first streak removal processing, a difference image P176 in the longitudinal direction is acquired. Here, in the difference image P176 in the longitudinal direction, the edge pixels, the number of which is equal to or larger than HIST_MAX, are included in a row in which the streak E170 has occurred. Thus, a position of the streak corresponding to E170 is detected in the second streak detection processing, and a difference image P178 in the longitudinal direction is acquired after the execution of the second streak removal processing. As indicated by E178, the streak is removed from the difference image P178 in the longitudinal direction. In this way, the streak E170 is removed from the input image P170. That is, when the position of the pixel at the end of the streak is larger than SEARCH_MAX and smaller than (CMAX−SEARCH_MAX), the streak E170 in FIG. 19 is not removed by the first streak removal processing. However, even in such a case, the streak is removed by the second streak removal processing when the total number of the edge pixels in the row, in which the streak has occurred, is equal to or larger than HIST_MAX.

Figure 21:
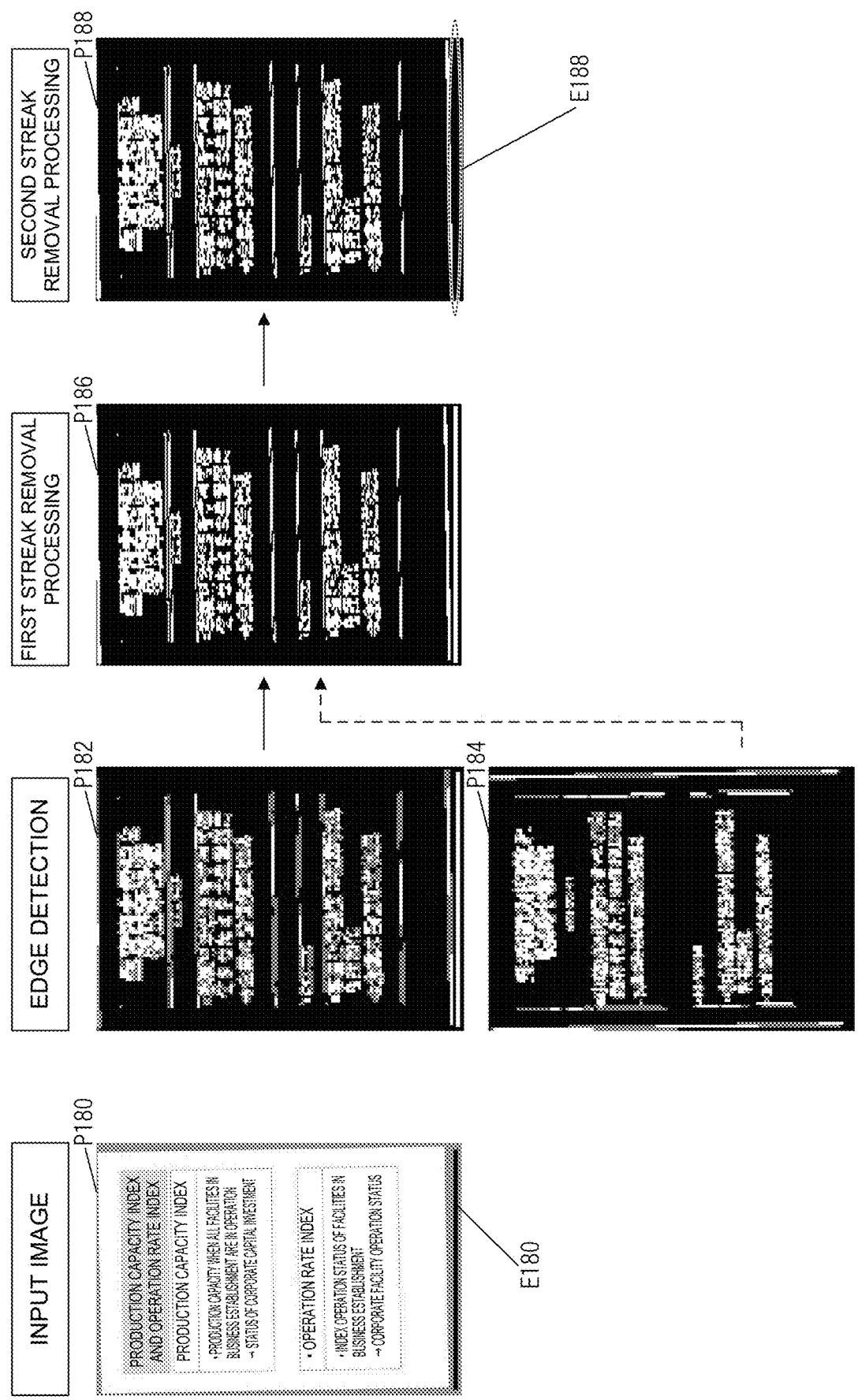
FIG. 21 is a view illustrating the operation example in the first embodiment.

FIG. 21 illustrates yet another example of the processing in the image forming apparatus 10 in the present embodiment. A streak E180 occur to an input image P180. At this time, a difference image P182 in the longitudinal direction and a difference image P184 in the transverse direction are acquired by the edge detection processing. Here, the streak E180 separates from the end of the input image by SEARCH_MAX or more. In this case, the streak E180 is not detected in the first streak detection processing. Thus, a difference image P186 in the longitudinal direction is acquired after the execution of the first streak removal processing. Here, the streak E180 remains in the difference image P186 in the longitudinal direction. The streak E180 is detected by the second streak detection processing. As a result, the streak E180 is removed by the second streak removal processing, and a difference image P188 in the longitudinal direction is acquired after the execution of the second streak removal processing. As indicated by E188, the streak is removed from the difference image P188 in the longitudinal direction. In this way, the streak E180 is removed from the input image P180.

Figure 22:
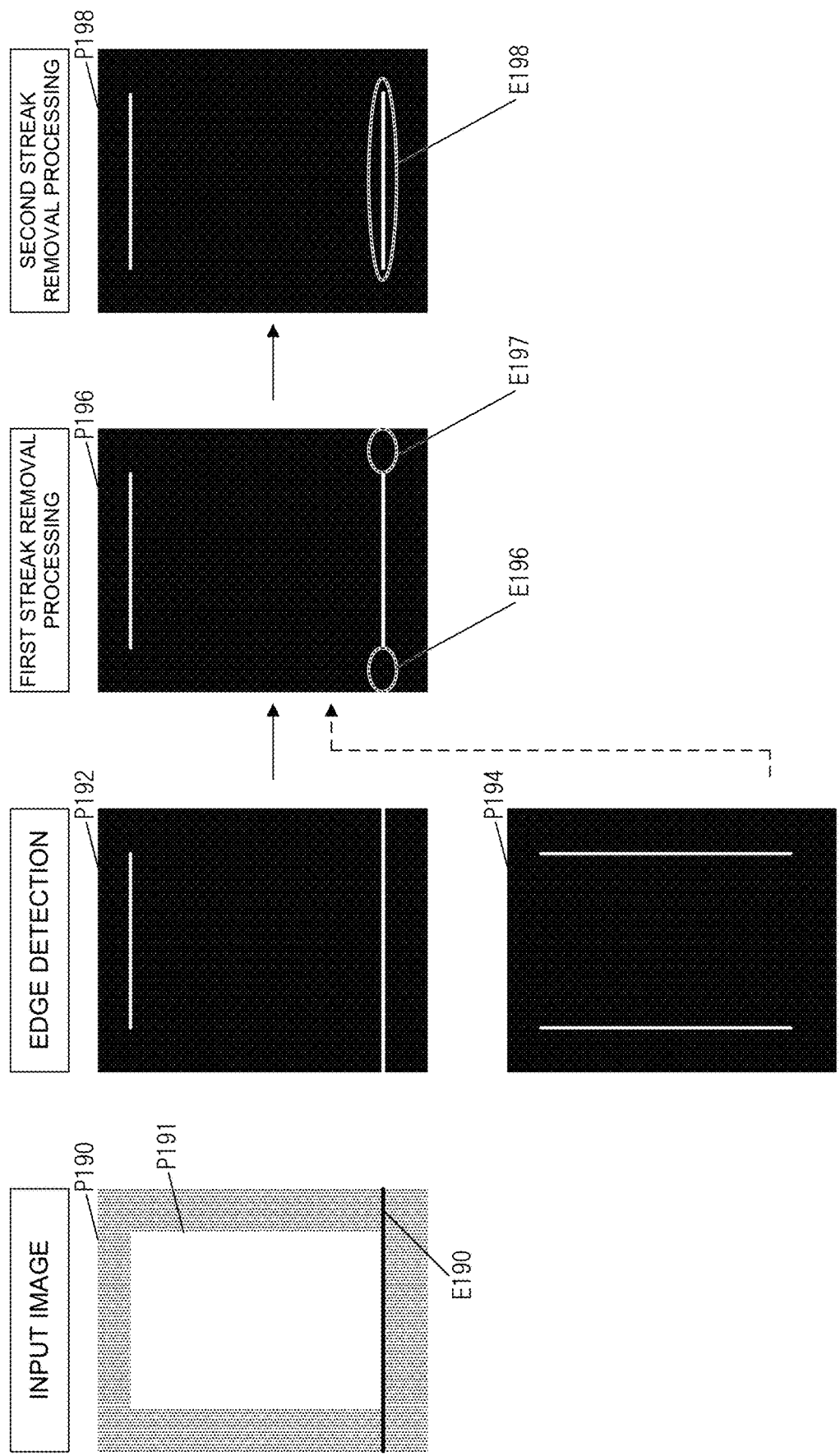
FIG. 22 is a view illustrating the operation example in the first embodiment.

FIG. 22 illustrates further another example of the processing in the image forming apparatus 10 in the present embodiment. In an input image P190, a streak E190 occurs in a manner to overlap an edge of a lower side of a document P191. At this time, a difference image P192 in the longitudinal direction and a difference image P194 in the transverse direction are acquired by the edge detection processing. The streak E190 is detected by the first streak detection processing, and the streak E190 is partially removed by the first streak removal processing. For example, as indicated by E196 and E197 in a difference image P196 in the longitudinal direction after the first streak removal processing, the edge pixels that appear in a range from the end of the document to SEARCH_STOP are removed.

Next, a position at which the number of the edge pixels is equal to or larger than HIST_MAX is detected by the second streak detection processing. Here, a position of the partially-removed streak E190 is not detected. As a result, a difference image P198 in the longitudinal direction is acquired after the execution of the second streak removal processing. For example, some of the edge pixels remain in the difference image P198 in the longitudinal direction. These edge pixels are the edge pixels of the lower side of the document. That is, not all of the edge pixels of the lower side of the document are removed from the input image P190, and only a part of the streak E190 is removed.

The order of the steps may be changed, or some of the steps may be omitted from those described above to the extent that there is no contradiction. For example, the controller 100 may execute the first streak detection processing and the second streak detection processing after executing the first streak removal processing and the second streak removal processing. Alternatively, the controller 100 may execute the first streak detection processing and the first streak removal processing after executing the second streak detection processing and the second streak removal processing. Further alternatively, the controller 100 may execute the first streak detection processing and the first streak removal processing in parallel with the second streak detection processing and the second streak removal processing.

The controller 100 may detect the row in which the streak has occurred in the second streak detection processing. In this case, instead of the processing illustrated in FIG. 9, the controller 100 executes processing illustrated in FIG. 23 as the second streak detection processing. The same processing as that illustrated in FIG. 9 will be denoted by the same reference signs, and the description thereon will not be made.

Figure 23:
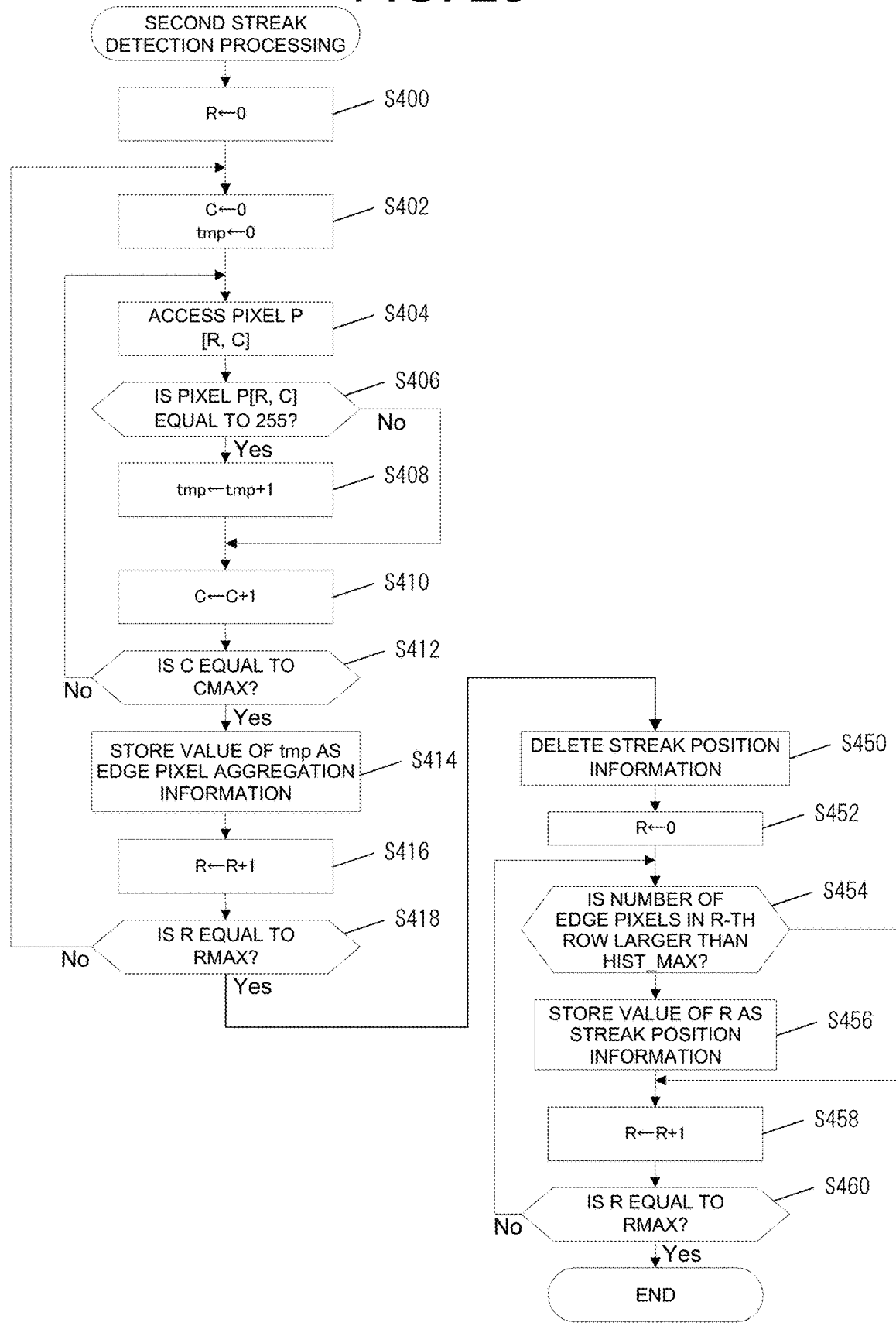
FIG. 23 is a flowchart illustrating another processing flow of the second streak detection processing.

In the processing illustrated in FIG. 23, the controller 100 executes the processing in step S400 to step S418 and thereby stores the edge pixel aggregation information (information on the histogram of the edge pixels). Next, the controller 100 deletes the streak position information from the streak position information storage area 168 (step S450), and plugs in 0 for the variable R (step S452).

Next, if the number of the edge pixels in the R-th row is larger than HIST_MAX, the controller 100 stores the value of the variable R as the streak position information (Step S454; Yes→Step S456). The processing in step S454 is the same as the processing in step S504 illustrated in FIG. 10. The thus-stored streak position information stored is information on the row (the position) including the streak, which is detected on the basis of the histogram of the number of the edge pixels as the second method. If the value of the variable tmp is equal to or smaller than HIST_MAX, the controller 100 omits the processing in step S454 (step S454; No).

Next, the controller 100 increments the variable R (step S458), and determines whether the value of the variable R is equal to RMAX (step S460). If the value of the variable R is equal to RMAX, the controller 100 terminates the processing illustrated in FIG. 23 (step S460; Yes). On the other hand, if the value of the variable R is not equal to RMAX, the processing returns to step S454 (step S460; No→step S454).

Figure 10:
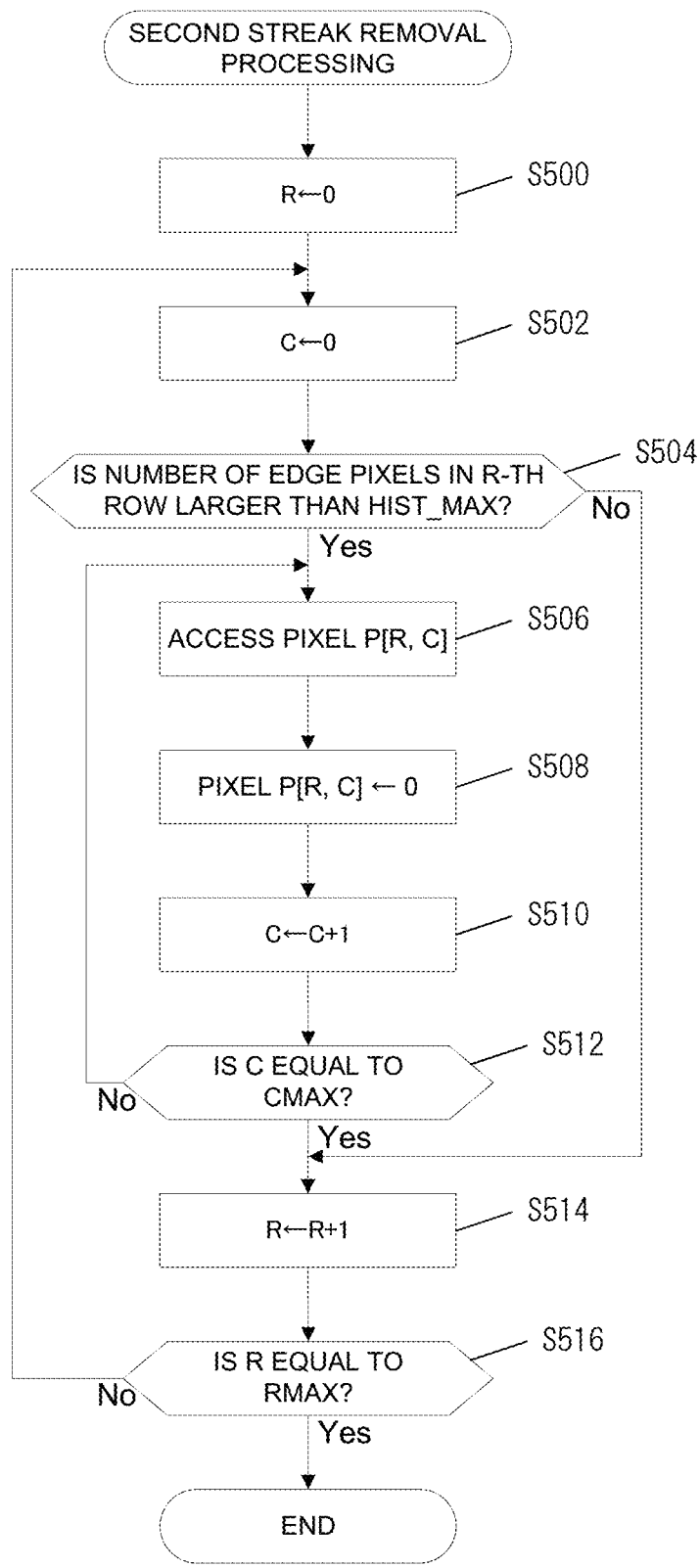
FIG. 10 is a flowchart illustrating a flow of second streak removal processing in the first embodiment.
Figure 24:
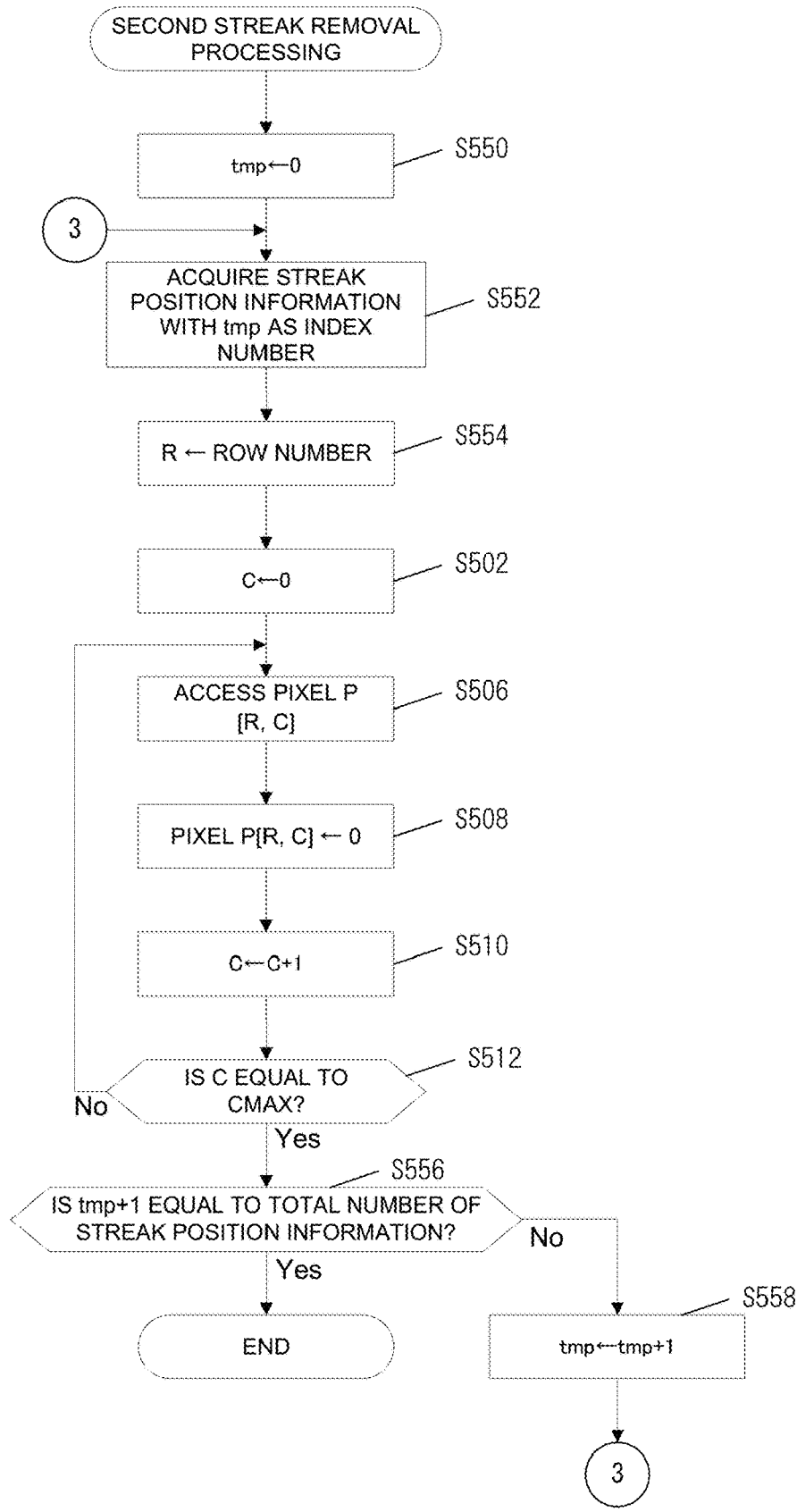
FIG. 24 is a flowchart illustrating another processing flow of the second streak removal processing.

In the case where the controller 100 executes the second streak detection processing illustrated in FIG. 23, the controller 100 executes processing illustrated in FIG. 24 as the second streak removal processing instead of the processing illustrated in FIG. 10. The same processing as that illustrated in FIG. 11 will be denoted by the same reference signs, and the description thereon will not be made.

First, the controller 100 plugs in 0 for the variable tmp (step S550). Then, the controller 100 acquires the streak position information with the index number as tmp from the streak position information storage area 168 (step S552), and plugs in the value of the row number, which is included in the acquired streak position information, for the variable R (step S554).

Next, the controller 100 executes the processing in step S502 and the processing from step S506 to step S512. If the value of the variable C is equal to CMAX, the controller 100 determines whether the value, which is acquired by adding 1 to the value of the variable tmp, is equal to the total number of the streak position information stored in the streak position information storage area 168 (step S556). If the value, which is acquired by adding 1 to the value of the variable tmp, is equal to the total number of the streak position information stored in the streak position information storage area 168, the controller 100 terminates the processing illustrated in FIG. 24 (step S556; Yes). On the other hand, if the value, which is acquired by adding 1 to the value of the variable tmp, is not equal to the total number of the streak position information stored in the streak position information storage area 168, the controller 100 increments the variable tmp, and then the processing returns to step S552 (step S556; No→step S558→step S552).

Just as described, even when the processing illustrated in FIG. 23 and FIG. 24 is executed, the controller 100 can delete the streak from the input image on the basis of the histogram of the number of the edge pixels.

The controller 100 may expand the edge pixel, which extends in the primary scanning direction, in the primary scanning direction in the difference image in the transverse direction. That is, the controller 100 extends the edge that extends in the up-down direction. In this way, in step S308 and step S318 of the first streak detection processing, the controller 100 can easily detect the edge pixels in a corner portion of the document among the edge pixels of the document.

The method for storing the information may appropriately be changed. For example, the streak position information may be stored as a variable-length array. In the variable-length array, the number of the row in which the pixel corresponding to the streak is present is stored. For example, in step S208 illustrated in FIG. 7, the controller 100 may plug in the value of R as a tmp-th element of a variable-length array ROW_Streak (ROW_Streak [tmp]←R). In addition, the edge pixel aggregation information may be stored as an array in which the number of the edge pixels present in the r-th row is stored in regard to the pixel P[r, c] of the difference image in the longitudinal direction. For example, in step S414 illustrated in FIG. 9, the controller 100 may plug in the value of tmp as an R-th element of an array hist (hist[R]←tmp).

In the above description, the determination on the streak is made on the basis of whether the pixel value of the pixel of interest in the difference image in the longitudinal direction is 255. However, the determination on the streak may be made in the case where the pixel value of the pixel of interest is equal to or larger than a predetermined threshold. For example, in step S206 illustrated in FIG. 7, if the pixel value of any of the pixel P[R, C] and the pixel P[R, CMAX−C] is equal to or larger than the predetermined threshold, the controller 100 may determine that the condition in step S206 is satisfied. Similarly, in step S406 illustrated in FIG. 9, if the pixel value of the pixel P[R, C] is equal to or larger than the predetermined threshold, the controller 100 may determine that the condition in step S406 is satisfied. Furthermore, similarly, in step S310 illustrated in FIG. 8, if the pixel value of the pixel of interest in the difference image in the transverse direction is equal to or larger than the predetermined threshold, the controller 100 may determine that the condition in step S310 is satisfied. That is, the controller 100 may set a condition other than the condition that the pixel value is 255 as the condition at the time of detecting the edge.

The first method and the second method described above are merely examples, and the controller 100 may remove the streak from the input image by another method.

As described above, the image forming apparatus in the present embodiment can remove only the edge of the streak without removing the edge of the document. In particular, in the present embodiment, by executing the two types of the streak detection processing and the streak removal processing, it is possible to detect and remove the streak in a manner to correspond to the streaks in various states such as the case where the edge of the streak separates from the end of the input image and the case where the edge of the streak overlaps the end of the document.

As described above, the image forming apparatus in the present embodiment can improve reliability of the removal of the streak by concurrently using the two methods that are the streak detection method using the difference images in the longitudinal direction and the transverse direction and the streak detection method using the histogram. More specifically, the image forming apparatus in the present embodiment executes the two types of the streak detection/removal processing in addition to the conventional skew correction/crop processing. In this way, the image forming apparatus can appropriately output the image that is based on the input image. In addition, in the streak removal method, the image forming apparatus in the present embodiment distinguishes the inside/outside the document from each other, reliably separates the inside/outside the document from each other, and executes the processing thereon. In this way, the image forming apparatus in the present embodiment can remove only the edge pixels outside the document among the edge pixels. Thus, the image forming apparatus in the present embodiment can leave the document edge as much as possible by removing the edge pixels outside the document. As a result, the image forming apparatus in the present embodiment can accurately detect the edge (the edge of the document) in the crop processing, can execute the appropriate image processing without causing inconvenience for the user, and can output the processed image.

2. SECOND EMBODIMENT

Next, a description will be made on a second embodiment. Unlike the first embodiment, in the second embodiment, in the case where images of the plural document sheets are acquired, the search range in the second sheet onward is limited on the basis of the information on the streak that is detected in the first document sheet. In the present embodiment, FIG. 3 and FIG. 6 in the first embodiment are respectively replaced with FIG. 25 and FIG. 26. The same processing will be denoted by the same reference sign, and the description thereon will not be made.

In the present embodiment, the parameter information storage area 166 stores, in addition to the parameter information described in the first embodiment, the parameter information that includes a parameter value (for example, "10") corresponding to a parameter name "Streak_Buf". Streak_Buf is a value indicating a processing range for the streak detection and the streak removal in the image of each of the second document sheet onward. In the following description, the parameter value that corresponds to the parameter name "Streak_Buf" will be described as Streak_Buf.

Figure 26:
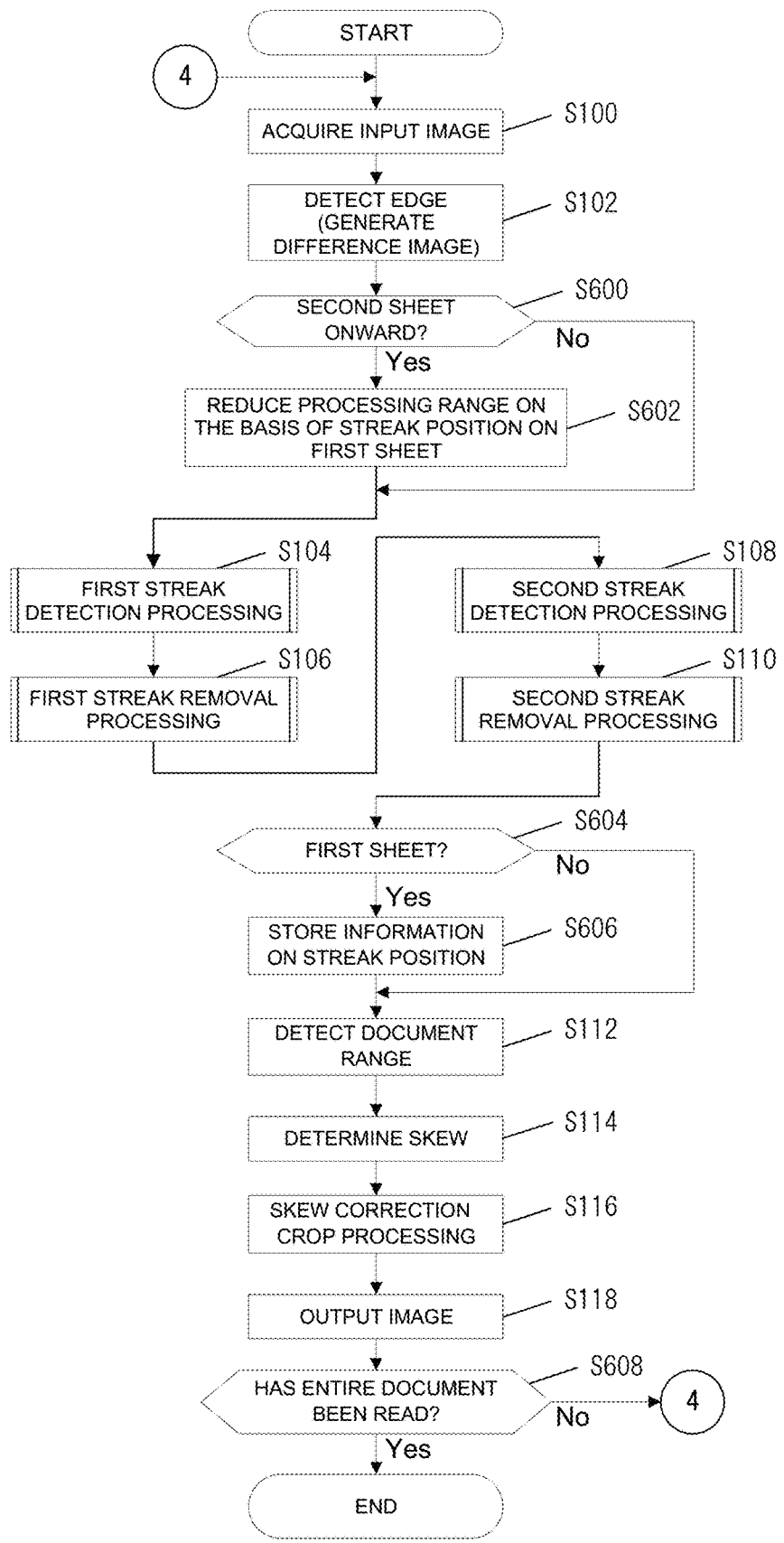
FIG. 26 is a flowchart illustrating a flow of main processing in the second embodiment.

A description will be made on the flow of the main processing in the present embodiment with reference to FIG. 26. In the present embodiment, after the difference image is generated in step S102, it is determined whether the document read in step S100 is the second sheet onward (step S600).

If the document is the second sheet onward, based on the position of the streak detected from the first document sheet, the controller 100 reduces the range (the processing range) that is subjected to the first streak detection processing, the first streak removal processing, the second streak detection processing, and the second streak removal processing (Step S600; Yes→Step S602). For example, the controller 100 reduces the processing range to a range that only includes Streak_Buf rows before and after the streak position. In this case, when the position (the row number) of the streak is R, the controller 100 reduces the processing range to a range from an (R−Streak_Buf)-th row to an (R+Streak_Buf)-th row. Accordingly, when detecting or removing the streak from the image of each of the second document sheet onward, the controller 100 can detect and remove the streak from the vicinity of the position of the streak detected from the image of the first document sheet.

Here, if the read document is not the second document sheet onward, that is, if the read document is not the first document sheet, the controller 100 omits the processing in Step S602 (Step S600; No). In this case, the range that is subjected to the first streak removal processing, the second streak detection processing, and the second streak removal processing is all the rows of the input image.

In the present embodiment, before executing the first streak detection processing, the controller 100 deletes the streak position information that is stored in the streak position information storage area 168. In this way, the controller 100 prevents the removal of the edge pixels from the input image of the document to be processed on the basis of the information on the streak that is detected from the document other than the document to be processed.

Next, after executing the second streak removal processing in step S110, the controller 100 determines whether the document read in step S100 is the first document sheet (step S604).

If the read document is the first document sheet, the controller 100 stores the information on the position (for example, the row number) of the streak, which is detected in the processing from step S104 to step S110, in the storage device 160 (step S604; Yes→step S606). The controller 100 may acquire the information on the position of the streak, which is detected from the first document sheet, by reading the information thereon in step S602.

On the other hand, if the read document is not the first document sheet, the controller 100 omits the processing in Step S606 (Step S604; No).

Then, after outputting the images in step S118, the controller 100 determines whether all the documents have been read (Step S608). If all the documents have been read, the controller 100 terminates the processing illustrated in FIG. 26 (Step S608; Yes). On the other hand, if not all the documents have been read, the processing returns to step S100 (step S608; No→step S100).

Figure 27A:
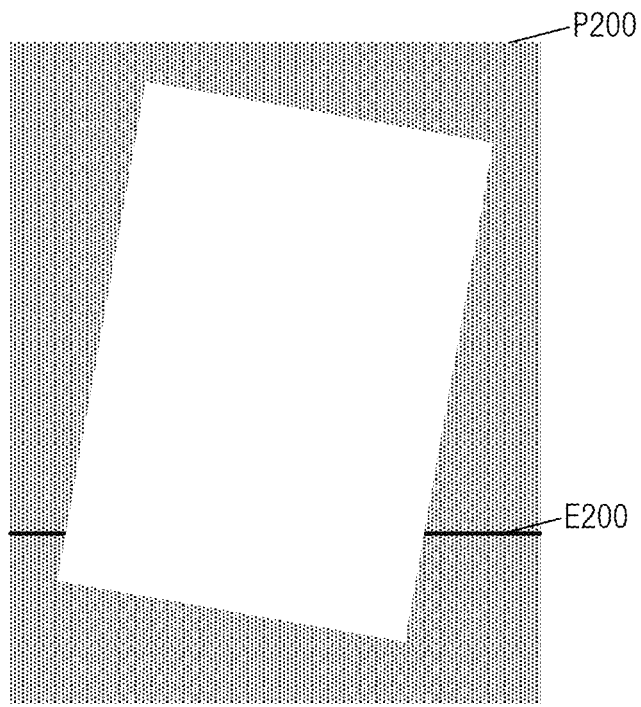
FIGS. 27A and 27B are views illustrating an operation example in the second embodiment.

A description will be made on an operation example in the present embodiment with reference to FIGS. 27A and 27B. FIG. 27A is a view illustrating an input image P200 that corresponds to the first document sheet. Here, it is assumed that a streak E200 is detected in the input image P200. The image forming apparatus 10 in the present embodiment stores the position of the streak E200 that is detected from the input image P200 of the first document sheet.

Figure 27B:
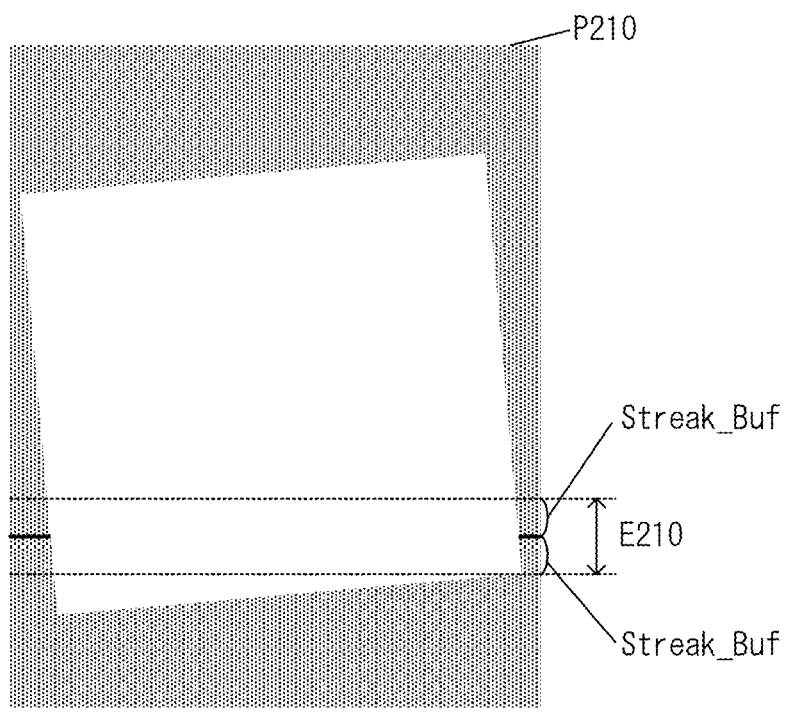

FIG. 27B is a view illustrating an input image P210 that corresponds to the second document sheet. In regard to the input image of the second document sheet, the image forming apparatus 10 only sets, as the streak detection/removal processing range, rows (E210) that correspond to the Streak_Buf rows before and after a position (a row) of the streak E200, which is detected from the input image P210 of the first document sheet.

The same applies to the input images of the third document sheet onward. The image forming apparatus 10 only sets, as the streak detection/removal processing range, rows (rows corresponding to E210 illustrated in FIG. 27B) that correspond to the Streak_Buf rows before and after the position of the streak E200.

Just as described, the image forming apparatus in the present embodiment uses the position of the streak detected in the first document sheet for the detection of the streak in and the removal of the streak from the input images of the second document sheet onward. More specifically, in regard to the input images of the second document sheet onward, the image forming apparatus sets, as the processing range, several rows before and after the position of the streak detected in the first document sheet, and then executes, on the input images of the second document sheet onward, the same processing as the streak detection processing and the streak removal processing on the input image of the first document sheet. In this way, the image forming apparatus can reduce a processing time that is required for the streak detection processing and the streak removal processing.

3. THIRD EMBODIMENT

Next, a description will be made on a third embodiment. Unlike the first embodiment, in the third embodiment, the streak is detected and removed on the basis of the scaled-down difference image. In the present embodiment, FIG. 6 in the first embodiment is replaced with FIG. 28. The same functional elements and processing will be denoted by the same reference signs, and the description thereon will not be made.

Figure 28:
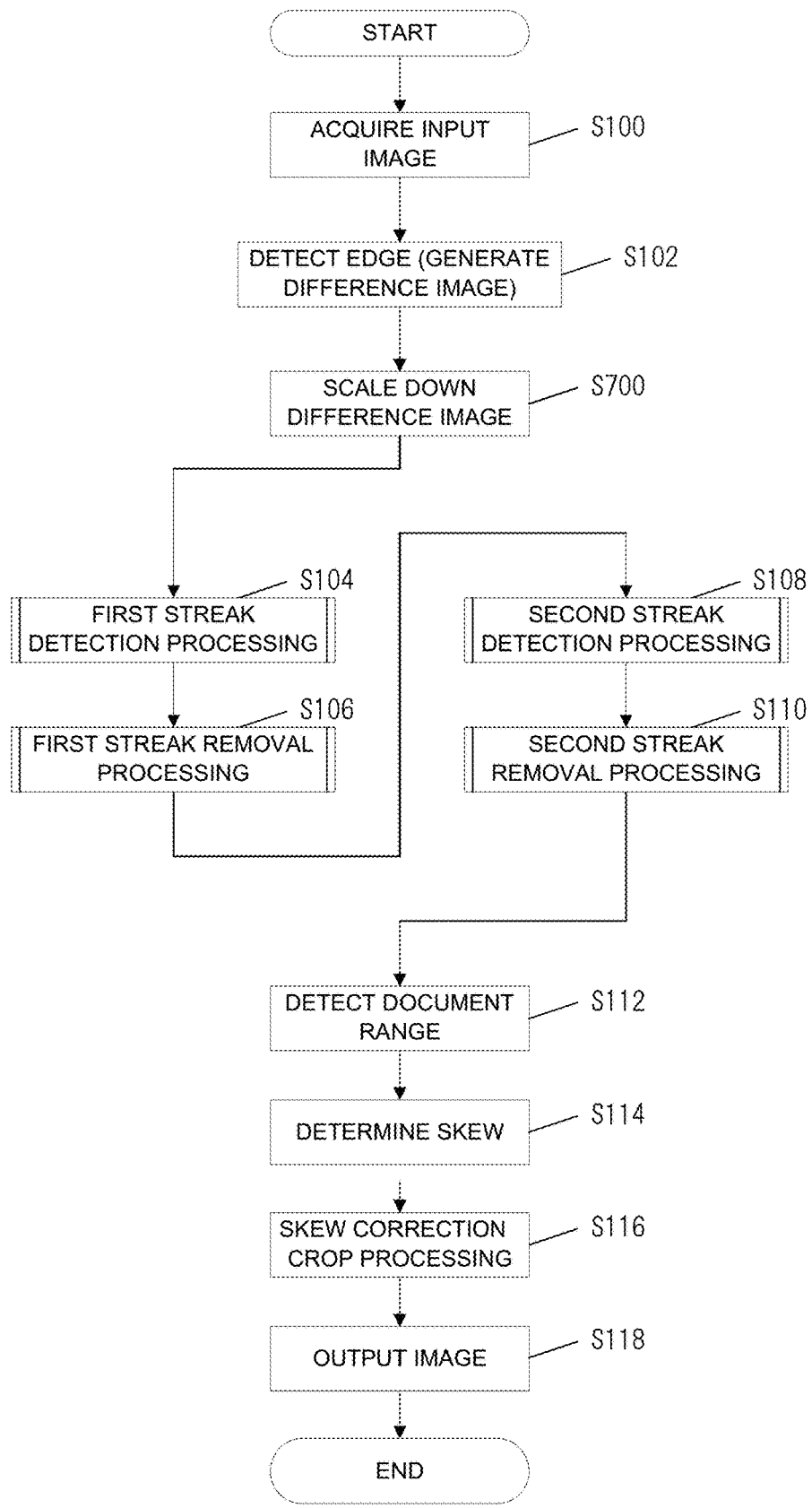
FIG. 28 is a flowchart illustrating a flow of main processing in a third embodiment.

A description will be made on the flow of the main processing in the present embodiment with reference to FIG. 28. In the present embodiment, after generating the difference image, the controller 100 scales down the difference image (step S700). For example, the controller 100 scales down a size of the entire difference image to one fourth (25%) by reducing both of a longitudinal length and a horizontal length of the difference image to one fourth.

In the present embodiment, the first streak detection processing, the first streak removal processing, the second streak detection processing, and the second streak removal processing are executed by using the scaled-down difference image.

A description will be made on a case where the difference image that has been scaled down a quarter size is used as an example. In the first streak detection processing, the controller 100 detects the position of the streak on the basis of the scaled-down difference image. At this time, the controller 100 calculates an occurrence position of the streak in the input image in consideration of a scale-down ratio of the difference image with respect to the input image. More specifically, when detecting the streak in the R-th row of the scaled-down difference image, the controller 100 determines that the streak occurs from a ($4 \times R$)-th row to a ($4 \times R+3$)-th row of the input image. In addition, in the first streak removal processing, when searching for the edge pixel from the position of c=0 in the scaled-down difference image in the transverse direction, and when the pixel at the position of c=C is the edge pixel, the controller 100 sets a range from a 0-th column to a ($4 \times C$)-th column as an edge deletion range in the input image.

Similarly, in the second streak removal processing, when the number of the edge pixels in the R-th row is equal to or larger than HIST_MAX, the controller 100 determines that the streak has occurred from the ($4 \times R$)-th row to the ($4 \times R+3$)-th row of the input image, and removes the edge pixels from such rows. In this way, when detecting and removing the streak from the input image, the controller 100 determines the row in which the streak has occurred and the range from which the streak is removed in consideration of the scale-down ratio of the difference image with respect to the input image.

Just as described, the image forming apparatus in the present embodiment executes the streak detection processing and the streak removal processing after scaling down the size of the difference image. As a result, the image forming apparatus can improve a processing speed and reduce an amount of memory to be used.

4. MODIFIED EXAMPLES

The aspect of the present disclosure is not limited to each of the above-described embodiments, and various modifications can be made thereto. That is, the technical scope of the present disclosure also includes an embodiment obtained by combining technical measures modified as appropriate without departing from the spirit of the present disclosure.

Furthermore, some parts of the above-described embodiments are separately described for convenience of the description but may obviously be implemented in combination within a technically allowable range. For example, the second embodiment and the third embodiment may be combined. In this case, the image forming apparatus executes the streak detection processing and the streak removal processing on the basis of the scaled-down difference image, and reduces the processing range in the input image of each of the second document sheet onward on the basis of the position of the streak detected from the first document sheet. As a result, the image forming apparatus can reduce the processing time for the processing to remove the streak from the input image.

In the above-described embodiment, the description has been made on the case where the image processing apparatus according to the aspect of the present disclosure is configured as the image forming apparatus. However, the image processing apparatus according to the aspect of the present disclosure may be applied to an image reading apparatus such as the scanner, or may be applied to a program, a plug-in, or the like that corrects the image. In addition, the image processing apparatus according to the aspect of the present disclosure may be applied as a server apparatus so as to be provided as an image correction service. In this case, after reading the image of the document, the image forming apparatus or the image reading apparatus transmits the read image as the input image to the image correction service. The image correction service executes, on the input image, the edge detection processing, the first streak detection processing, the first streak removal processing, the second streak detection processing, and the second streak removal processing, and then transmits the input image after the execution of the processing to the image forming apparatus or the image reading apparatus which has transmitted the input image. Thereafter, the image forming apparatus or the image reading apparatus may execute the image processing, such as the skew processing or the crop processing, on the image received from the image correction service.

The program that is operated on each of the devices in the embodiments is a program that controls the CPU or the like (a program which makes a computer function) so as to implement the functions of the above-described embodiments. The information handled by these devices is temporarily accumulated in a temporary storage device (for example, random access memory (RAM)) during the processing, is then stored in various storage devices such as read only memory (ROM) and an HDD, and is read, corrected, and written by the CPU as needed.

Here, a recording medium that stores the program may be, for example, any of a semiconductor medium (for example, ROM and a non-volatile memory card), an optical recording medium/magneto-optical recording medium (for example, a digital versatile disc (DVD), a magneto optical disc (MO), a Mini Disc (MD), a compact disc (CD), and a Blu-ray® Disc (BD)), and a magnetic recording medium (for example, a magnetic tape and a flexible disk). In addition, not only the functions described in the above embodiments are implemented by executing the loaded program, but the functions according to the aspect of the present disclosure may also be implemented by the processing executed by an operating system alone or in cooperation with another application program or the like on the basis of a command of such a program.

Furthermore, when the program is to be distributed to the market, the program may be stored in a portable recording medium for distribution or transferred to a server computer connected via a network such as the Internet. In this case, a storage device of the server computer is also included in the aspect of the present disclosure as a matter of course.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image processing apparatus comprising:
an input device that inputs a document image; and
a controller, wherein:
the controller
removes a first streak from the image by a first method,
removes a second streak from the image by a second method that differs from the first method, and
executes crop processing on the image from which the first streak and the second streak have been removed,
in the first method, the controller detects, as the first streak, an edge near a parallel side, which is parallel to a primary scanning direction in the image, and removes the first streak, and
among pixels forming a row that includes the first streak detected near the parallel side, the controller further replaces at least one pixel included from the parallel side to an end portion of the document with another pixel and thereby removes the first streak.

2. The image processing apparatus according to claim 1, wherein
among edge pixels that are detected on a basis of a difference in pixel value between adjacent pixels in a secondary scanning direction in the image, the controller further detects, as a pixel at the end portion of the document, an edge pixel that is located closest to the parallel side.

3. An image processing apparatus comprising:
an input device that inputs a document image; and
a controller, wherein:
the controller
removes a first streak from the image by a first method,
removes a second streak from the image by a second method that differs from the first method, and
executes crop processing on the image from which the first streak and the second streak have been removed,
in the second method, the controller;
aggregates, per row, a number of edge pixels included in a row of the image,
detects, as the second streak, at least one pixel included in the row in which the number of the edge pixels is larger than a predetermined threshold, and
removes the second streak.

4. The image processing apparatus according to claim 3, wherein
the controller further replaces the at least one pixel included in the row in which the number of the edge pixels is larger than the predetermined threshold with another pixel, and thereby removes the second streak.

5. An image processing apparatus comprising:
an input device that inputs a document image; and
a controller, wherein:
the controller
removes a first streak from the image by a first method,
removes a second streak from the image by a second method that differs from the first method,
executes crop processing on the image from which the first streak and the second streak have been removed,
generates a difference image in a primary scanning direction and a difference image in a secondary scanning direction, the difference image in the primary scanning direction generated based on a difference in pixel value between adjacent pixels in the primary scanning direction, and the difference image in the secondary scanning direction generated based on a difference in pixel value between adjacent pixels in the secondary scanning direction, and
removes the first streak by using the difference image in the primary scanning direction and the difference image in the secondary scanning direction.

6. The image processing apparatus according to claim 5, wherein
the difference image in the primary scanning direction comprises a scaled-down difference image in the primary scanning direction and the difference image in the secondary scanning direction comprises a scaled-down difference image in the secondary scanning direction.

7. A control method for an image processing apparatus comprising:
removing a first streak from an input image by a first method;
removing a second streak from the image by a second method that differs from the first method;
executing crop processing on the image from which the first streak and the second streak have been removed;
generating a difference image in a primary scanning direction and a difference image in a secondary scanning direction, the difference image in the primary scanning direction generated based on a difference in pixel value between adjacent pixels in the primary scanning direction, and the difference image in the secondary scanning direction generated based on a difference in pixel value between adjacent pixels in the secondary scanning direction; and
removing the first streak by using the difference image in the primary scanning direction and the difference image in the secondary scanning direction.

8. A non-transitory computer-readable medium that stores a program including one or more instructions that, when executed by at least one processor, cause the at least one processor to:
remove a first streak from an input image by a first method;
remove a second streak from the image by a second method that differs from the first method;
execute crop processing on the image from which the first streak and the second streak have been removed;
generate a difference image in a primary scanning direction and a difference image in a secondary scanning direction, the difference image in the primary scanning direction generated based on a difference in pixel value between adjacent pixels in the primary scanning direction, and the difference image in the secondary scanning direction generated based on a difference in pixel value between adjacent pixels in the secondary scanning direction; and
remove the first streak by using the difference image in the primary scanning direction and the difference image in the secondary scanning direction.

* * * * *